US012596914B2

(12) United States Patent (10) Patent No.: US 12,596,914 B2
Changiz Rezaei et al. (45) Date of Patent: Apr. 7, 2026

(54) GENERATIVE ADVERSARIAL NEURAL ARCHITECTURE SEARCH

(71) Applicants:Seyed Saeed Changiz Rezaei, Vancouver (CA); Fred Xuefei Han, Edmonton (CA); Di Niu, Edmonton (CA)

(72) Inventors: Seyed Saeed Changiz Rezaei, Vancouver (CA); Fred Xuefei Han, Edmonton (CA); Di Niu, Edmonton (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 1193 days.

(21) Appl. No.: 17/516,025

(22) Filed: Nov. 1, 2021

(65) Prior Publication Data

US 2023/0140142 A1 May 4, 2023

(51) Int. Cl.
*G06N 3/0475* (2023.01)
*G06N 3/045* (2023.01)
*G06N 3/088* (2023.01)

(52) U.S. Cl.
CPC ........... *G06N 3/0475* (2023.01); *G06N 3/045* (2023.01); *G06N 3/088* (2013.01)

(58) Field of Classification Search
CPC ... G06F 18/2113; G06F 18/214; G06N 3/045; G06N 3/0475; G06N 3/088
See application file for complete search history.

(56) References Cited

U.S. PATENT DOCUMENTS

| | | | | |
|---|---|---|---|---|
| 10,152,970 B1 * | 12/2018 | Olabiyi | ................. | G06N 3/044 |
| 2019/0114348 A1 | 4/2019 | Gao et al. | | |
| 2019/0147320 A1 * | 5/2019 | Mattyus | .............. | G06V 20/182 |
| | | | | 382/155 |
| 2019/0258984 A1 | 8/2019 | Rehman et al. | | |
| 2019/0317739 A1 * | 10/2019 | Turek | .................... | G06N 3/045 |
| 2021/0256392 A1 | 8/2021 | Chen et al. | | |
| 2022/0138473 A1 * | 5/2022 | Kwatra | ................. | G06V 10/82 |
| | | | | 382/190 |

FOREIGN PATENT DOCUMENTS

| | | | | |
|---|---|---|---|---|
| WO | 2021063476 A1 | 4/2021 | | |
| WO | WO-2022065771 A1 * | 3/2022 | ............. | G06F 17/18 |

OTHER PUBLICATIONS

David Laredo, "Automatic Model Selection for Neural Networks", 2019 arXiv (Year: 2019).*

(Continued)

*Primary Examiner* — Matthew Ell

(57) ABSTRACT

A method and system for neural architectural search (NAS) for performing a task. A generative adversarial network comprising a generator and a discriminator receives, from a user device, a query for neural network architecture, the query including a search space. The generator of the generative adversarial network generates a plurality of generated neural network architectures responsive to the received search space. The discriminator of the generative adversarial network selects an optimal neural network architecture from among the plurality of generated neural network architectures. The optimal generated neural network architecture is transmitted to the user device.

20 Claims, 11 Drawing Sheets

(56) References Cited

OTHER PUBLICATIONS

Zhilong Lu, "Leveraging Graph Neural Network With LSTM For Traffic Speed Prediction", 2019 IEEE (Year: 2019).*

Goodfellow et al., "Generative Adversarial Nets", arxiv:1496.2661v1, 2014.*

Huang et al., "Searching by Generating: flexible and efficient one-shot NAS with architecture generator", CVPR, 2021.*

Lukasik et al., "Learning Where to Look—Generative NAS is surprisingly efficient", Computer Vision—ECCV, 2022.*

Elsken, Thomas, Jan Hendrik Metzen, and Frank Hutter. "Neural architecture search: A survey." arXiv preprint arXiv:1808.05377 2018.

Kaicheng Yu, Christian Sciuto, Martin Jaggi, Claudiu Musat, and Mathieu Salzmann. Evaluating the search phase of neural architecture search 2019.

Liam Li and Ameet Talwalkar. Random search and reproducibility for neural architecture search. In Uncertainty in Artificial Intelligence, PMLR 2020.

Hanxiao Liu, Karen Simonyan, and Yiming Yang. Darts: Differentiable architecture search. arXiv preprint arXiv:1806.09055 2018.

Sirui Xie, Hehui Zheng, Chunxiao Liu, and Liang Lin. Snas: stochastic neural architecture search. arXiv preprint arXiv:1812.09926 2018.

Kirthevasan Kandasamy, Willie Neiswanger, Jeff Schneider, Barnabas Poczos, and Eric P Xing. Neural architecture search with bayesian optimisation and optimal transport. In Advances in neural information processing systems 2018.

Hieu Pham, Melody Y Guan, Barret Zoph, Quoc V Le, and Jeff Dean, Efficient neural architecture search via parameter sharing, arXiv preprint arXiv:1802.03268 2018.

Barret Zoph, Vijay Vasudevan, Jonathon Shlens, and Quoc V Le, Learning transferable architectures for scalable mage recognition, In Proceedings of the IEEE conference on computer vision and pattern recognition 2018.

Antoine Yang, Pedro M Esperança, and Fabio M Carlucci, Nas evaluation is frustratingly hard, arXiv preprint arXiv:1912.12522 2019.

Chris Ying, Aaron Klein, Eric Christiansen, Esteban Real, Kevin Murphy, and Frank Hutter, Nasbench-101: Towards reproducible neural architecture search, In International Conference on Machine Learning 2019.

Xuanyi Dong and Yi Yang, Nas-bench-201: Extending the scope of reproducible neural architecture search, In International Conference on Learning Representations 2020.

Julien Siems, Lucas Zimmer, Arber Zela, Jovita Lukasik, Margret Keuper, and Frank Hutter, Nasbench-301 and the case for surrogate benchmarks for neural architecture search, arXiv preprint arXiv:2008.09777 2020.

Xin Chen, Lingxi Xie, Jun Wu, and Qi Tian, Progressive differentiable architecture search: Bridging the depth gap between search and evaluation, In Proceedings of the IEEE International Conference on Computer Vision 2019.

Yuhui Xu, Lingxi Xie, Xiaopeng Zhang, Xin Chen, Guo-Jun Qi, Qi Tian, and Hongkai Xiong, Pc-darts: Partial channel connections for memory-efficient architecture search, In International Conference on Learning Representations 2020.

Xiangning Chen and Cho-Jui Hsieh, Stabilizing differentiable architecture search via perturbation based regularization, arXiv preprint arXiv:2002.05283 2020.

Liam Li, Mikhail Khodak, Maria-Florina Balcan, and Ameet Talwalkar, Geometry-aware gradient algorithms for neural architecture search, arXiv preprint arXiv:2004.07802 2020.

Yao Shu, Wei Wang, and Shaofeng Cai, Understanding architectures learnt by cell-based neural architecture search, In International Conference on Learning Representations 2019.

Han Cai, Ligeng Zhu, and Song Han, Proxylessnas: Direct neural architecture search on target task and hardware, arXiv preprint arXiv:1812.00332 2018.

Bichen Wu, Xiaoliang Dai, Peizhao Zhang, Yanghan Wang, Fei Sun, Yiming Wu, Yuandong Tian, Peter Vajda, Yangqing Jia, and Kurt Keutzer, Fbnet: Hardware-aware efficient convnet design via differentiable neural architecture search, In Proceedings of the IEEE Conference on Computer Vision and Pattern Recognition 2019.

Mingxing Tan, Bo Chen, Ruoming Pang, Vijay Vasudevan, Mark Sandler, Andrew Howard, and Quoc V Le, Mnasnet: Platform-aware neural architecture search for mobile, In Proceedings of the IEEE Conference on Computer Vision and Pattern Recognition 2019.

Mingxing Tan and Quoc V Le, Efficientnet: Rethinking model scaling for convolutional neural networks, arXiv preprint arXiv:1905.11946 2019.

Gabriel Bender, Hanxiao Liu, Bo Chen, Grace Chu, Shuyang Cheng, Pieter-Jan Kindermans, and Quoc V Le, Can weight sharing outperform random architecture search? an investigation with tunas, In Proceedings of the IEEE/CVF Conference on Computer Vision and Pattern Recognition, 2020.

Linnan Wang, Yiyang Zhao, Yuu Jinnai, Yuandong Tian, and Rodrigo Fonseca, Neural architecture search using deep neural networks and monte carlo tree search, In Proceedings of the AAAI Conference on Artificial Intelligence, vol. 34 2020.

Zewei Chen, Fengwei Zhou, George Trimponias, and Zhenguo Li, Multi-objective neural architecture search via non-stationary policy gradient, arXiv preprint arXiv:2001.08437 2020.

Jiahui Yu, Pengchong Jin, Hanxiao Liu, Gabriel Bender, Pieter-Jan Kindermans, Mingxing Tan, Thomas Huang, Kiaodan Song, Ruoming Pang, and Quoc Le, Bignas: Scaling up neural architecture search with big single-stage models, arXiv preprint arXiv:2003.11142 2020.

Renqian Luo, Xu Tan, Rui Wang, Tao Qin, Enhong Chen, and Tie-Yan Liu, Semi-supervised neural architecture search, arXiv preprint arXiv:2002.10389 2020.

Reuven Y Rubinstein and Dirk P Kroese, The cross-entropy method: a unified approach to combinatorial optimization, Monte-Carlo simulation and machine learning, Springer Science & Business Media 2013.

John Schulman, Filip Wolski, Prafulla Dhariwal, Alec Radford, and Oleg Klimov, Proximal policy optimization algorithms, arXiv preprint arXiv:1707.06347 2017.

Goodfellow, Ian, Jean Pouget-Abadie, Mehdi Mirza, Bing Xu, David Warde-Farley, Sherjil Ozair, Aaron Courville, and Yoshua Bengio, Generative adversarial nets, In Advances in neural information processing systems 2014.

Kingma, Diederik P., and Max Welling, Auto-encoding variational bayes, arXiv preprint arXiv:1312.6114 2013.

Sutton, Richard S., David McAllester, Satinder Singh, and Yishay Mansour, Policy gradient methods for reinforcement earning with function approximation, Advances in neural information processing systems 12 1999.

Renqian Luo, Fei Tian, Tao Qin, Enhong Chen, Tie-Yan Liu, Neural architecture optimization 2018.

Xiaoliang Dai, Alvin Wan, Peizhao Zhang, Bichen Wu, Zijian He, Zhen Wei, Kan Chen, Yuandong Tian, Matthew Yu, and Peter Vajda, bnetv3: Joint architecture-recipe search using neural acquisition function, arXiv preprint arXiv:2006.02049 Mar. 3, 2020.

Alexia Jolicoeur-Martineau, The relativistic discriminator: a key element missing from standard gan, arXivpreprint arXiv:1807.00734 Sep. 10, 2018.

Christopher Morris, Martin Ritzert, Matthias Fey, William L. Hamilton, Jan Eric Lenssen, Gau-rav Rattan, and Martin Grohe, Weisfeiler and Leman go neural: Higher-order Graph Neural Networks, arXiv:1810.02244 Oct. 4, 2018.

Colin White, Willie Neiswanger, and Yash Savani, Bananas: Bayesian optimization with neural architectures for neural architecture search, arXiv preprint arXiv:1910.11858 Oct. 25, 2018.

Jiaxuan You, Bowen Liu, Zhitao Ying, Vijay Pande, and Jure Leskovec, Graph convolutional policy network for goal-directed molecular graph generation, In Advances in neural information processing systems 2018.

(56) References Cited

OTHER PUBLICATIONS

Seyed Saeed Changiz Rezaei, Fred X. Han, Di Niu, Mohammad Salameh, Keith Mills, Shuo Lian, Wei Lu, Shangling Jui, Generative Adversarial Neural Architecture Search, arXiv:2105.09356 Jun. 23, 2021.

Chen, Xiangning, and Cho-Jui Hsieh, Stabilizing Differentiable Architecture Search via Perturbation-based Regularization, arXiv:2002. 05283 Feb. 12, 2020.

Arber Zela, Thomas Elsken, Tonmoy Saikia, Yassine Marrakchi, Thomas Brox and Frank Hutter, Understanding and robustifying differentiable architecture search, arXiv:1909.09656 Sep. 2, 2019.

Dong, Xuanyi, and Yi Yang, "Searching for a robust neural architecture in four GPU hours", Proceedings of the IEEE Conference on computer vision and pattern recognition, arXiv:1910.04465 Oct. 10, 2019.

Yunchen Pum Zhe Gan, Ricardo Henao, Xin Yuan, Chunyuan Li, Andrew Stevens and Lawrence Carin, Variational Autoencoder for Deep Learning of Images, Labels and Captions, arXiv:1609.08976 Sep. 28, 2016.

* cited by examiner

---

Algorithm 1 GA-NAS Algorithm

---

1: Input: An initial set of architectures $\mathcal{X}_0$; Discriminator $D$; Generator $G(x; \theta_0)$; A positive integer $k$;

2: for $t = 1, 2, \ldots, T$ do

3:      $\mathcal{T} \leftarrow$ top $k$ architectures of $\bigcup_{i=0}^{t-1} \mathcal{X}_i$ according to the performance evaluator $S(.)$.

4:      Train $G$ and $D$ to obtain their parameters $$(\theta_t, \phi_t) \longleftarrow \arg \min_{\theta_t} \max_{\phi_t} V\left(G_{\theta_t}, D_{\phi_t}\right) =$$

$$\mathbb{E}_{x \sim p_{\mathcal{T}}} \left[\log D_{\phi_t}(x)\right] + \mathbb{E}_{x \sim p(x; \theta_t)} \left[\log \left(1 - D_{\phi_t}(x)\right)\right].$$

5:      Let $G(x; \theta_t)$ generate a new set of architectures $\mathcal{X}_t$.

6:      Evaluate the performance $S(x)$ of every $x \in \mathcal{X}_t$.

7: end for

Algorithm 2 Training Discriminator $D$ and the Generator $G$

---

1: Input: Discriminator $D$; Generator $G(x; \theta_{t-1})$; Data set $\mathcal{T}$.

2: for $t' = 1, 2, \ldots, T'$ do

3:      Let $G(x; \theta_{t-1})$ generate $k$ random architectures to form the set $\mathcal{F}$.

4:      Train discriminator $D$ with $\mathcal{T}$ being positive samples and $\mathcal{F}$ being negative samples.

5:      Using the output of $D(x)$ as the main reward signal, train $G(x; \theta_t)$ with Reinforcement Learning.

6: end for

| Algorithm | Acc (%) | #Q |
|---|---|---|
| Random Search [†] | 93.66 | 2000 |
| RE [†] | 93.97 | 2000 |
| NAO [†] | 93.87 | 2000 |
| BANANAS | 94.23 | 800 |
| SemiNAS [†] | 94.09 | 2100 |
| SemiNAS [†] | 93.98 | 300 |
| GA-NAS-setup1 | 94.22 | 150 |
| GA-NAS-setup2 | 94.23 | 378 |

FIG. 10

| Algorithm | Mean Acc (%) | Mean Rank | Average #Q |
|---|---|---|---|
| Random Search | 93.84 ± 0.13 | 498.80 | 648 |
| Random Search | 93.92 ± 0.11 | 211.50 | 1562 |
| GA-NAS-Setup1 | 94.22 ± 4.45e-5 | 2.90 | 647.50 ± 433.43 |
| GA-NAS-Setup2 | 94.23 ± 7.43e-5 | 2.50 | 1561.80 ± 802.13 |

FIG. 11

| Algorithm | Mean Acc | Best Acc | Best Rank |
|---|---|---|---|
| DARTS [†] | 92.21 ± 0.61 | 93.02 | 57079 |
| NAO [†] | 92.59 ± 0.59 | 93.33 | 19552 |
| ENAS [†] | 91.83 ± 0.42 | 92.54 | 96939 |
| GA-NAS | 92.80 ± 0.54 | 93.46 | 5386 |

FIG. 12

| Algorithm | CIFAR-10 | | | CIFAR-100 | | | ImageNet-16-120 | | |
|---|---|---|---|---|---|---|---|---|---|
| | Mean Acc | Rank | #Q | Mean Acc | Rank | #Q | Mean Acc | Rank | #Q |
| REA† | 93.92 ± 0.30 | - | - | 71.84 ± 0.99 | - | - | 45.54 ± 1.03 | - | - |
| RS† | 93.70 ± 0.36 | - | - | 71.04 ± 1.07 | - | - | 44.57 ± 1.25 | - | - |
| REINFORCE† | 93.85 ± 0.37 | - | - | 71.71 ± 1.09 | - | - | 45.24 ± 1.18 | - | - |
| BOHB† | 93.61 ± 0.52 | - | - | 70.85 ± 1.28 | - | - | 44.42 ± 1.49 | - | - |
| RS-500 | 94.11 ± 0.16 | 30.81 | 500 | 72.54 ± 0.54 | 30.89 | 500 | 46.34 ± 0.41 | 34.18 | 500 |
| GA-NAS | 94.34 ± 0.05 | 4.05 | 444 | 73.28 ± 0.17 | 3.25 | 444 | 46.80 ± 0.29 | 7.40 | 445 |

† The results are taken directly from NAS-Bench-201

FIG. 13

| Algorithm | Avg. Acc | Avg. Rank | Avg. #Q |
|---|---|---|---|
| RL-NAS-1 | 94.14 ± 0.10 | 20.8 | 7093 ± 3904 |
| RL-NAS-2 | 93.78 ± 0.14 | 919.0 | 314 ± 300 |
| GA-NAS-Setup1 | 94.22 ± 4.5e-5 | 2.9 | 648 ± 433 |
| GA-NAS-Setup2 | 94.23 ± 7.4e-5 | 2.5 | 1562 ± 802 |

FIG. 14

| ResNet | | | |
|---|---|---|---|
| Algorithm | Best Acc | Train Seconds | #Weights (M) |
| Hand-crafted | 93.18 | 2251.6 | 20.35 |
| Random Search | 93.84 | 1836.0 | 10.62 |
| GA-NAS | 93.96 | 1993.6 | 11.06 |
| Inception | | | |
| Algorithm | Best Acc | Train Seconds | #Weights (M) |
| Hand-crafted | 93.09 | 1156.0 | 2.69 |
| Random Search | 93.14 | 1080.4 | 2.18 |
| GA-NAS | 93.28 | 1085.0 | 2.69 |

FIG. 15

| Network | #Params | Top-1 Acc |
|---|---|---|
| EfficientNet-B0 (no augment) | 5.3M | 76.7 |
| GA-NAS-ENet-1 | 4.6M | 76.5 |
| GA-NAS-ENet-2 | 5.2M | 76.8 |
| GA-NAS-ENet-3 | 5.3M | 76.9 |
| ProxylessNAS-GPU | 4.4M | 75.1 |
| GA-NAS-ProxylessNAS | 4.9M | 75.5 |

GENERATIVE ADVERSARIAL NEURAL ARCHITECTURE SEARCH

TECHNICAL FIELD

The present application is directed to neural network architecture, and in particular, to a method and system for determining architectures for a neural network.

BACKGROUND

Automated Machine Learning (AutoML) is a broad field of research associated with automating the process of applying machine learning to real-world problems with little to no human intervention. That is to say, for a given task, such as object detection, image classification, image segmentation or speech recognition, the goal of an AutoML algorithm is to automatically produce a neural network model that performs well on the task. Neural Architecture Search (NAS) is a subset of AutoML methods concerned with automating the design of neural network architectures.

NAS algorithms primarily comprise of three core components: (1) a search space—the set of all possible candidate architectures; (2) a search algorithm—the method by which the search space is traversed; and (3) an evaluation strategy—how the search algorithm gauges the performance of architectures in the search space.

One common approach to speed up the evaluation strategy component of NAS is by condensing all possible candidate architectures in the search space into one neural network, called a "supernet". The advent of a weight-sharing supernet has further improved the performance of supernet-based algorithms. Differentiable Architecture Search (DARTS) as described in "*Darts: Differentiable architecture search*" by Liu, Hanxiao, Karen Simonyan, and Yiming Yang (2018), the disclosure of which is incorporated herein in its entirety, is a well known NAS algorithm that utilizes a weight-sharing supernet and can also be characterized as a differential architecture search algorithm. The search space is defined in a continuous domain, which allows DARTS to use calculus-based methods differential approaches like gradient descent as its search algorithm. For example, a model search is first performed on a supernet by a search algorithm for a set number of times. Upon completion of the model search, one of the candidate architectures located by the search algorithm in the supernet is considered as the best architecture. This located architecture is then expanded and retrained from scratch in order to perform a formal evaluation.

However, research literature has shown that differentiable NAS algorithms like DARTS may suffer from an inherent lack of search space exploration. Specifically, in "*Understanding Architectures Learnt by Cell-based Neural Architecture Search*", Shu, Yao, Wei Wang, and Shaofeng Cai, International Conference on Learning Representations (2019), the disclosure of which is incorporated herein in its entirety, that DARTS may be biased towards selecting architectures that are wide and shallow over architectures that are deep and narrow. In more general terms, this means that the search algorithm of DARTS may only visit specific regions of the search space. The bias of the DARTS algorithm stems, at least part, from its gradient-based search algorithm such as gradient descent, which, by design, seeks and converges towards the nearest local loss minima as quickly as possible. Consequently, gradient-based NAS algorithms may gravitate towards regions of the search space where the supernet can train rapidly. The lack of exploration may in some cases mean that the best architecture was never explored or attempted by the NAS algorithm. Moreover, due to the nature of optimization in DARTS, minor changes to the currently selected architecture can result in significant drops in performance. Thus in practice, the portions of the search space visited by the search algorithm of DARTS is very narrow. Attempts have been made to address the issues with the DARTS search algorithm. In "*Stabilizing Differentiable Architecture Search via Perturbation-based Regularization*", Chen, Xiangning, and Cho-Jui Hsieh (2020), the disclosure of which is incorporated herein in its entirety, it was proposed that the search algorithm may be modified such that the performance penalty imposed when changing the supernet architecture is dramatically reduced. Although such modifications may permit increased exploration within the supernet, it lacks a mechanism that actively encourage supernet exploration.

Additionally, by monitoring the states of the search algorithm during execution, it has also been shown in "*Understanding and robustifying differentiable architecture search*", Zela, Arber, et al. (2019), the disclosure of which is incorporated herein in its entirety, that DARTS may be unstable and unable to generalize to different search spaces. Proposals have been made to address such instability by implementing an early stopping routine. While this technique may improve performance, in practice, an early stopping routine may limit the exploration potential as the search algorithm is allotted far less time to navigate the search space.

Furthermore, supernets are trained to minimize the loss as a whole instead of maximizing the performance of individual architectures. As the final evaluation of an architecture is performed on discrete architectures derived from the supernet, a discretization error, or optimization gap, exists between the performance of an architecture acting as part of a larger supernet and its true performance when evaluated individually.

Various approaches to improve the DARTS algorithm have been made in the research literature. In "*PC-darts: Partial channel connections for memory-efficient differentiable architecture search*", Xu, Yuhui, et al. (2019), the disclosure of which is incorporated herein in its entirety, the authors propose a Partially Connected DARTS (PC-DARTS) to modify the search space of DARTS to speed up the execution of experiments. While the number of architectures provided by both approaches is identical, PC-DARTS uses partial channel connections to reduce the memory overhead needed during training. Using the same hardware, PC-DARTS is capable of performing experiments with a larger batch size as well as performing experiments on larger datasets.

Other approaches, including Stochastic NAS (SNAS) as described in "*SNAS: stochastic neural architecture search*", Xie, Sirui, et al (2018) and Gradient-based search using Differentiable Architecture Sampler (GDAS) as described in "*Searching for a robust neural architecture in four GPU hours*", Dong, Xuanyi, and Yi Yang, Proceedings of the IEEE Conference on computer vision and pattern recognition, (2019), the disclosures of which are incorporated herein in their entirety, are similar approaches to DARTS. Both SNAS and GDAS methods employ the use of Gumbel Softmax when operating on the search space. The search algorithm is more specific in describing the architectures it selects. The selection mechanism also employs further exploration compared to DARTS. However, the final results of the method are inferior to that of DARTS.

Accordingly, there exists a need for a neural architecture search method and system that overcomes one or more of the shortcomings of the existing approaches described above.

SUMMARY

This application provides a method and system of generative adversarial neural architecture search (GA-NAS). The GA-NAS uses a cross-entropy method for neural architecture search that may be implemented using a generative adversarial network (GAN) or any other generator model such as variational auto encoders (VAEs) and its variants. An example of a suitable GAN is described in Goodfellow, Ian, Jean Pouget-Abadie, Mehdi Mirza, Bing Xu, David Warde-Farley, Sherjil Ozair, Aaron Courville, and Yoshua Bengio, *Generative adversarial nets*, In Advances in neural information processing systems, pp. 2672-2680, 2014, (hereinafter "*Generative adversarial nets*") the content of which is incorporated herein by reference. An example of a suitable VAE is described in Kingma, Diederik P., and Max Welling, *Auto-encoding variational bayes*, arXiv preprint arXiv: 1312.6114 (2013), the content of which is incorporated herein by reference. Discrete-action reinforcement learning (RL) or other policy gradient RL algorithm may be used as the generator component of a GAN for the NAS. Examples of suitable RL algorithm include that described in Sutton, Richard S., David McAllester, Satinder Singh, and Yishay Mansour, *Policy gradient methods for reinforcement learning with function approximation*, Advances in neural information processing systems 12, pp. 1057-1063, 1999, and in John Schulman, Filip Wolski, Prafulla Dhariwal, Alec Radford, and Oleg Klimov, *Proximal policy optimization algorithms*, arXiv preprint arXiv:1707.06347, 2017, the content of which is incorporated herein by reference. The GA-NAS may output a state representation of an optimal neural network architecture obtained by a graph neural network (GNN) during the NAS.

There is a desire to find hardware friendly neural network architectures on smartphones and chipsets. GA-NAS may improve the performance of smartphones and chipsets by identifying deep learning models to be used thereon. The optimized neural network models can boost the performance of smartphones and chipsets. GA-NAS may improve the performance of smartphones and chipsets embodying the optimized neural network models. GA-NAS can mimic user supplied Neural Architecture cells to generate new Neural Architecture cells with improved performance in terms of accuracy or latency or other hardware measurements. GA-NAS can potentially generate a collection of high quality neural architecture cells to be reused to construct larger neural networks in other downstream machine learning tasks such as image classification, image segmentation, camera ISP, object detection, speech recognition, natural language Processing (NLP), etc.

GA-NAS can also be applied to search for an optimized version of a user supplied network in a short amount of time, and to search for hyper-parameters in a macro net, like the depth or the number of channels.

Neural architecture search (NAS) improves neural network model design by replacing the manual trial-and-error process with an automatic search procedure, and has achieved state-of-the-art performance on many computer vision tasks. Since the underlying search space of architectures grows exponentially as a function of the architecture size, searching for an optimum neural architecture is by trial-and-error is very difficult. A typical NAS method comprises a search phase and an evaluation phase. The GA-NAS of the present disclosure is concerned with the search phase. The most important performance criteria of the search phase are robustness, reproducibility and search cost. Typical search strategies include random search, differentiable architecture search and optimization (e.g., DARTS, SNAS, Bayesian optimization (e.g., NASBOT described in Kirthevasan Kandasamy, Willie Neiswanger, Jeff Schneider, Barnabas Poczos, and Eric P Xing, *Neural architecture search with bayesian optimisation and optimal transport*, In Advances in neural information processing systems, pp. 2016C2025, 2018, incorporated herein by reference, and reinforcement learning such as efficient NAS (ENAS) described in Hieu Pham, Melody Y Guan, Barret Zoph, Quoc V Le, and Jeff Dean, *Efficient neural architecture search via parameter sharing*, arXiv preprint arXiv: 1802.03268, 2018, and NASNet described in Barret Zoph, Vijay Vasudevan, Jonathon Shlens, and Quoc V Le, *Learning transferable architectures for scalable image recognition*, In Proceedings of the IEEE conference on computer vision and pattern recognition, pp. 8697-8710, 2018, the content of both of these documents being incorporated herein by reference).

In spite of a proliferation of NAS strategies proposed, issues on the robustness and reproducibility of existing NAS methods have been raised. To promote reproducibility and fair comparisons among methods, multiple NAS benchmarks have recently emerged, including NAS-Bench-101, NAS-Bench-201, and NAS-Bench-301, which are datasets that map neural network architectures to evaluation metrics. This provides an opportunity for researchers to fairly benchmark different search algorithms in terms of searching for the highest-ranked architectures within the least number of queries to architecture performance, the latter being a good indicator of the search cost. GA-NAS can find high-performing architectures in all three benchmarks and proves to be a highly robust algorithm that is not sensitive to search spaces.

DARTS has given rise to numerous optimization schemes for NAS. While the objectives of these algorithms may vary, they all operate in the same or similar search space. However, academic studies have demonstrated that DARTS performs similarly to a random search and its search results heavily dependent on the initial random seed (See, Kaicheng Yu, Christian Sciuto, Martin Jaggi, Claudiu Musat, and Mathieu Salzmann, *Evaluating the search phase of neural architecture search,* 2019 incorporated herein by reference). Furthermore, DARTS is criticized for converging to architectures with smooth loss landscapes which may not generalize well. In contrast, the GA-NAS of the present disclosure aims to train an architecture generator using the GAN framework while using importance sampling to gradually shift toward more important parts of the search space. The GA-NAS of the present disclosure has a convergence guarantee under certain assumptions. Its results are reproducible and are not sensitive to initial seeds.

Besides the cell-based search spaces (such as ENAS and DARTS), the GA-NAS of the present disclosure, as a search strategy, also applies to macro-search, which searches for an ordering of a predefined set of blocks. The GA-NAS of the present disclosure may be used by improvements by iteratively generating better ordering of the same set of MBConv blocks (or inverted residual blocks). For example, experimental data has shown that the GA-NAS of the present disclosure can improve EfficientNet, described in Mingxing and Quoc V Le, *EfficientNet: Rethinking model scaling for convolutional neural networks*, arXiv preprint arXiv:

1905.11946, 2019, (hereinafter "EfficientNet") the content of which is incorporated herein by reference.

On the other hand, a number of RL-based NAS methods have been proposed. ENAS [is the first reinforcement learning scheme in weight-sharing NAS. It has been shown that guided policies decisively exceed the performance of random search on vast search spaces (See, Gabriel Bender, Hanxiao Liu, Bo Chen, Grace Chu, Shuyang Cheng, Pieter-Jan Kindermans, and Quoc V Le, *Can weight sharing outperform random architecture search? An investigation with tunas*, In Proceedings of the IEEE/CVF Conference on Computer Vision and Pattern Recognition, pp. 14323-14332, 2020, incorporated herein by reference). In Linnan Wang, Yiyang Zhao, Yuu Jinnai, Yuandong Tian, and Rodrigo Fonseca, *Neural architecture search using deep neural networks and monte carlo tree search*, In Proceedings of the AAAI Conference on Artificial Intelligence, volume 34, pp. 9983-9991, 2020, incorporated herein by reference, Monte Carlo Tree Search is used to balance exploration with exploitation during search. Unlike these approaches, the GA-NAS of the present disclosure proves to be a highly efficient RL solution to NAS, since the rewards used to train the generator network comes from the relative performance prediction of the discriminator instead of from architecture evaluation. The discriminator component of the GA-NAS of the present disclosure can lower the number of architecture evaluations tremendously, which is typically a bottleneck in any NAS method.

Hardware-friendly NAS algorithms may take constraints such as model size, FLOPS, and inference time into account, usually by introducing regularizers into the loss functions. Contrary to these methods, the GA-NAS of the present disclosure can support ad-hoc search tasks by enforcing customized hard constraints in importance sampling instead of resorting to approximate penalty terms. The GA-NAS of the present disclosure can find new architectures that may enhance accuracy and/or the number of parameters by searching in their original search spaces. For example, experimental results show improve in terms of ImageNet Top-1 with respect to EfficientNet and ProxylessNAS, described in Cai, Ligeng Zhu, and Song Han, *ProxylessNAS: Direct neural architecture search on target task and hardware*, arXiv preprint arXiv:1812.00332, 2018, incorporated herein by reference.

In accordance with an embodiment of the first aspect of the present disclosure, there is provided a method for neural architectural search (NAS) for performing a task. A generative adversarial network comprising a generator and a discriminator receives, from a user device, a query for neural network architecture, the query including a search space. The generator of the generative adversarial network generates a plurality of neural network architectures responsive to the received search space. The discriminator of the generative adversarial network selects an optimal neural network architecture from among the plurality of generated neural network architectures. The optimal generated neural network architecture is transmitted to the user device.

In some or all examples, the method further comprises: training the generative adversarial network by: generating, by the generator component of the generative adversarial network, generated neural network architectures based on training data, evaluating, by the discriminator of the generative adversarial network, the generated neural network architectures, ranking, by the discriminator, the generated neural network architectures, and adjusting one or more parameters of the generator based on the ranking of the generated neural network architectures.

In some or all examples, the training data comprises a set of true architectures.

In some or all examples, the discriminator applies a Siamese scheme in which a pair of architectures in which one architecture is from a set of true architectures and the other architecture is from either the set of true architectures or a set of fake architectures comprised of generated neural network architectures.

In some or all examples, the discriminator is trained by minimizing a cross-entropy loss between the truth class and predicted probabilities generated from candidate architectures from the set of true architectures and set of fake architectures respectively.

In some or all examples, the generator comprises an encoder and a decoder.

In some or all examples, the encoder is a graph neural network (GNN)-based, auto-regressive architecture encoder comprising a recurrent neural network (RNN) and GNN.

In some or all examples, the decoder comprises a multilayer perceptron (MLP) that outputs an operator probability distribution and a Gated Recurrent Unit (GRU) that recursively determines edge connections to previous operators.

In some or all examples, the generator represents each architecture as a Directed In some or all examples, the discriminator comprises a GNN followed by a MLP classifier.

In some or all examples, the task is one of object detection, image classification, image segmentation or speech recognition.

In some or all examples, the method further comprises: applying the optimal generated neural network architecture to the task.

In some or all examples, the optimal generated neural network architecture is defined by a plurality of neural network architecture parameters, and applying the optimal generated neural network architecture to the task comprises configuring a neural network in accordance with the plurality of neural network architecture parameters, and operating the neural network to perform the task.

In accordance with another aspect of the present disclosure, there is provided a computing device comprising one or more processors and a memory, the memory having tangibly stored thereon executable instructions for execution by the one or more processors. The executable instructions, in response to execution by the one or more processors, cause the one or more processors to perform the methods described above and herein.

In accordance with a further aspect of the present disclosure, there is provided a non-transitory machine-readable storage medium having tangibly stored thereon executable instructions for execution by one or more processors of a computing system. The executable instructions, in response to execution by the one or more processors, cause the one or more processors and computing system to perform the methods described above and herein.

Other aspects and features of the present disclosure will become apparent to those of ordinary skill in the art upon review of the following description of specific implementations.

BRIEF DESCRIPTION OF THE DRAWINGS

FIG. 6 illustrates an example pseudo-code representation of an algorithm for training a GAN to perform the GA-NAS in accordance with an example embodiment of the present disclosure.

FIG. 7 illustrates an example pseudo-code representation of an algorithm for training a discriminator and a generator of a GAN configured to perform the GA-NAS.

FIG. 10 illustrates a table showing the results of searching on NAS-Bench-101 without weight sharing.

FIG. 11 illustrates a table showing the average statistics of the best cells found on NAS-Bench-101 without weight sharing averaged over 10 runs.

FIG. 12 illustrates a table showing the results of searching on NAS-Bench-101 with weight-sharing.

FIG. 13 illustrates a table showing the results of searching on NAS-Bench-201 without weight sharing.

FIG. 14 illustrates a table showing the results of an ablation study on NAS-Bench-101 by removing the discriminator and directly querying the benchmark for reward.

FIG. 15 illustrates a table showing a table showing constrained search results on NAS-Bench-101 for different algorithms.

DETAILED DESCRIPTION OF EXAMPLE EMBODIMENTS

Figure 1:
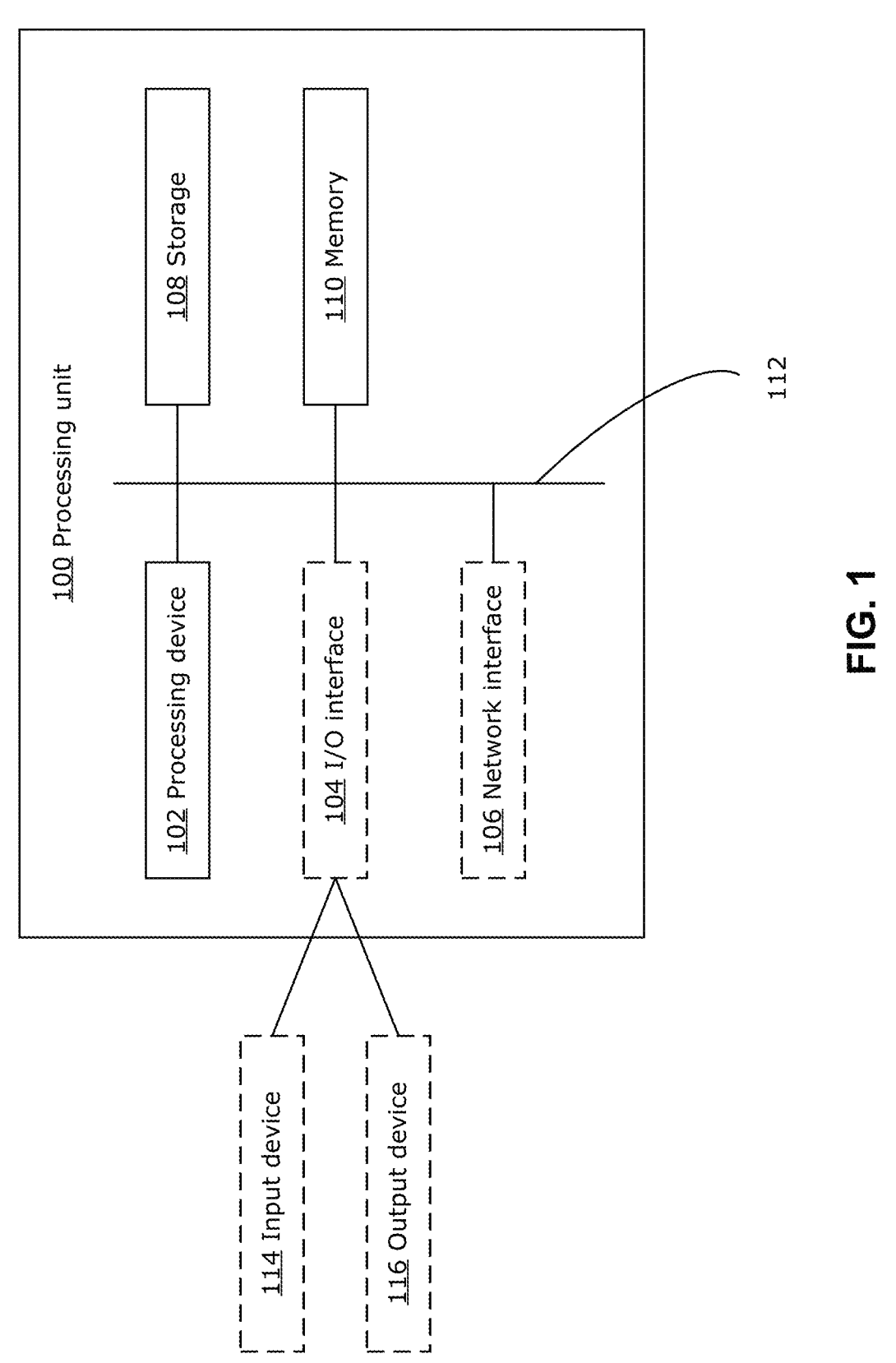
FIG. 1 illustrates a simplified block diagram of an example computing system that may be used in accordance with an example embodiment of the present disclosure.

The present disclosure is made with reference to the accompanying drawings, in which embodiments of technical solutions are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable storage medium. Lastly, elements referred to in the singular may be plural and vice versa, except where indicated otherwise either explicitly or inherently by context.

The following acronyms or terms used in the present disclosure have the meanings indicated below: "NAS" means Neural Architecture Search, "AutoML" means Automatic Machine Learning, "WS" means weight-sharing, "RL" means Reinforcement Learning, "GAN" means Generative Adversarial Network, "VAE" means Variational AutoEncoder, "PPO" means Proximal Policy Optimization, "GNN" means Graph Neural Network, "Batch size" means a number of data samples fed into a neural network at a time, "search space" means a set of candidate architectures, "search algorithm" means a routine that operates on a search space, "evaluation strategy" means a method by which the performance of a candidate architecture is measured, and "policy" means a search algorithm when RL is based.

The GA-NAS of the present disclosure addresses several issues with current NAS approaches by proposing importance sampling ideas and cross-entropy method for rare-event simulation for the NAS problem, implementing the Cross-Entropy method using a generative adversarial network (GAN) or any other generator model such as variational auto encoders (VAEs) and its variants, increasing the exploration capabilities of GANs by using a reinforcement learning-based controller as the generator in a GAN, and incorporating hard ad-hoc constraints during the search, like those imposed by the hardware such as memory consumptions and latency, to improve existing models.

The present disclosure generally describes a GA-NAS that determines an architecture for a neural network that is configured to perform a particular neural network task, such as object detection, image classification, image segmentation or speech recognition. The object of the GA-NAS of the present disclosure is to generate a neural network architecture which is better than a user-supplied architecture in terms of accuracy as well as hardware-friendliness constraints such as latency.

The GA-NAS of the present disclosure is an iterative process for carrying out neural architecture search—an efficient and search algorithm for NAS. The GA-NAS of the present disclosure uses RL to train an architecture generator network based on recurrent neural network (RNN) and graph neural network (GNN). The GA-NAS iteratively updates a discriminator that can distinguish the currently top architectures from randomly generated architectures and uses the relative prediction from the discriminator to train the generator to sample even better architectures in the next iteration. This enables the generator to be efficiently trained without many queries to true architecture performance.

FIG. 1 illustrates a block diagram of an example simplified computing system 100. The computing device 100 may be a user device that communicates with another computing device that is used to perform a neural architecture search to determine an optimal neural network architecture to perform a specific task (e.g. image classification, object recognition, etc.) in accordance with example embodiments of the present disclosure, a computing device that is used to perform the neural architecture search in accordance with example embodiments of the present disclosure, or a computing device configured to provide an optimal neural network architecture in accordance with example embodiments of the present disclosure and trained to perform the specific task. Other computing system suitable for implementing embodiments described in the present disclosure may be used, which may include components different from those discussed below. In some examples, the computing system may be implemented across more than one physical hardware unit, such as in a parallel computing, distributed computing, virtual server, or cloud computing configuration. Although FIG. 1 shows a single instance of each component, there may be multiple instances of each component in the computing system 100.

The computing system 100 may include one or more processing device(s) ("processors") 102, such as a central processing unit (CPU) with a hardware accelerator, a graphics processing unit (GPU), a tensor processing unit (TPU), a neural processing unit (NPU), a microprocessor, an application-specific integrated circuit (ASIC), a field-programmable gate array (FPGA), a dedicated logic circuitry, a dedicated artificial intelligence processor unit, or combinations thereof.

The computing system 100 may also include one or more optional input/output (I/O) interfaces 104, which may enable interfacing with one or more optional input devices 114 and/or optional output devices 116. In the example shown, the input device(s) 114 (e.g., a keyboard, a mouse, a microphone, a touchscreen, and/or a keypad) and output device(s) 116 (e.g., a display, a speaker and/or a printer) are shown as optional and external to the computing system 100. In other examples, one or more of the input device(s) 114 and/or the output device(s) 116 may be included as a component of the computing system 100. In other examples, there may not be any input device(s) 114 and output device(s) 116, in which case the I/O interface(s) 104 may not be needed.

The computing system 100 may include one or more optional network interfaces 106 for wired or wireless communication with a network (e.g., an intranet, the Internet, a P1P network, a WAN and/or a LAN) or other node. The network interfaces 106 may include wired links (e.g., Ethernet cable) and/or wireless links (e.g., one or more antennas) for intra-network and/or inter-network communications.

The computing system 100 may also include one or more storage units 108, which may include a mass storage unit such as a solid state drive, a hard disk drive, a magnetic disk drive and/or an optical disk drive. The computing system 100 may include one or more memories 110, which may include a volatile or non-volatile memory (e.g., a flash memory, a random access memory (RAM), and/or a read-only memory (ROM)). The non-transitory memory(ies) 110 may store instructions for execution by the processing device(s) 102, such as to carry out examples described in the present disclosure. The memory(ies) 110 may include other software instructions, such as for implementing an operating system and other applications/functions. In some examples, memory 110 may include software instructions for execution by the processing device 102 to train a neural network and/or to implement a trained neural network, as disclosed herein.

In some other examples, one or more data sets and/or modules may be provided by an external memory (e.g., an external drive in wired or wireless communication with the computing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

A bus 112 may provide communication among components of the computing system 100, including the processing device(s) 102, optional I/O interface(s) 104, optional network interface(s) 106, storage unit(s) 108 and/or memory(ies) 110. The bus 112 may be any suitable bus architecture including, for example, a memory bus, a peripheral bus or a video bus.

Figure 2:
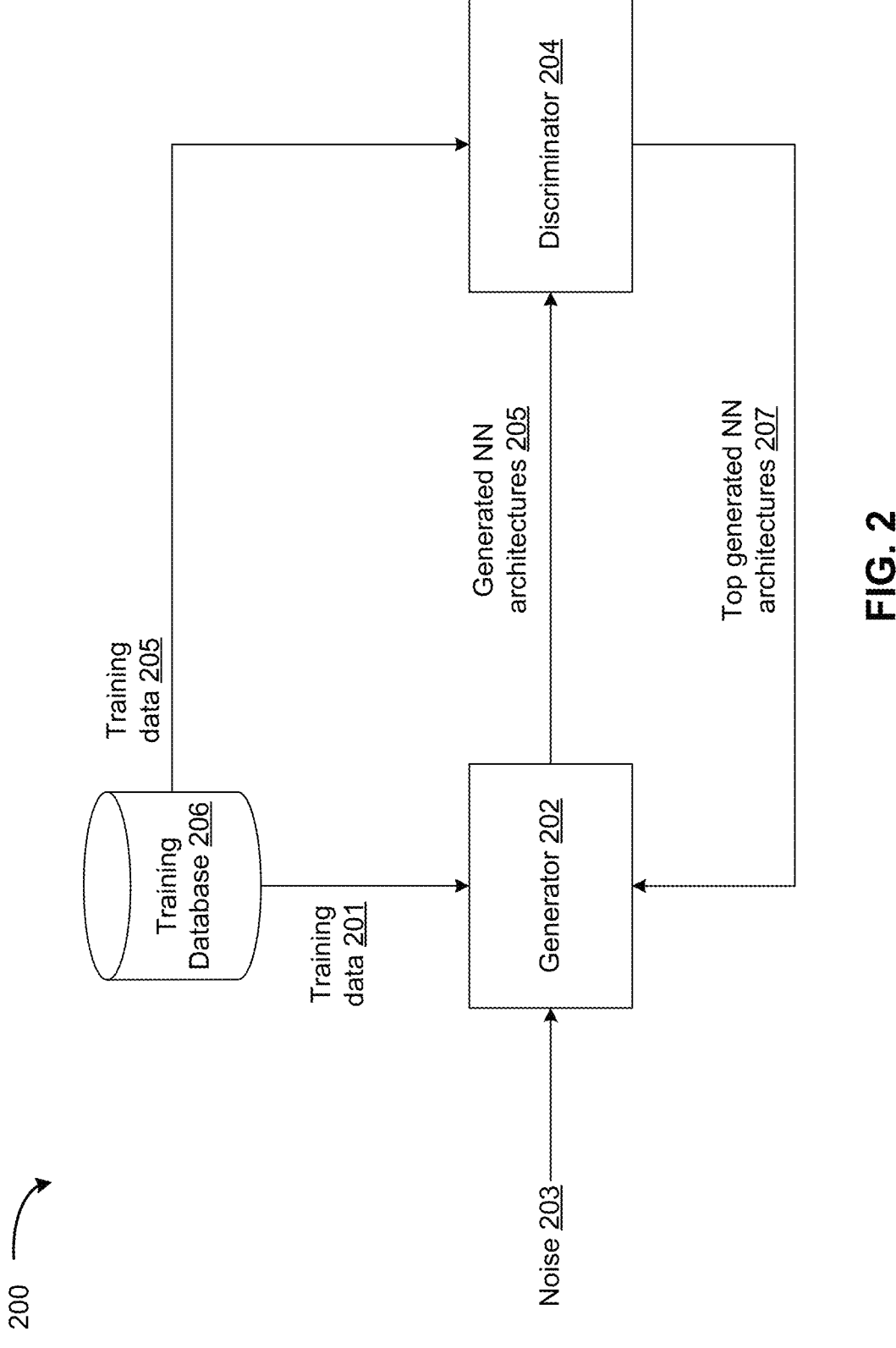
FIG. 2 illustrates a simplified block diagram of an example embodiment GAN in a training stage in accordance with an example embodiment of the present disclosure.

FIG. 2 illustrates a simplified block diagram of an example embodiment of a generator model in the form of a GAN 200 in a training stage in accordance with the present disclosure. The GAN 200 The GAN 200 is an example of a system that may be used to implement the GA-NAS of the present disclosure on one or more computing systems 100 in one or more locations. The simplification of the GAN 200 is not intended to be limiting and is provided for the purpose of illustration only.

The GAN 200 comprises a neural network based generator 202 and a neural network based discriminator 204. The generator 202 includes an encoder and a decoder, described more fully below. The encoder of the generator 202 may be a GNN-based, auto-regressive architecture encoder comprising a recurrent neural network (RNN) and graph neural network (GNN). The discriminator 204 includes an encoder and a discriminator. The discriminator 204 may comprise a shared k-GNN followed by a multi-layer perceptrons (MLP) classifier. Other types of neural networks or MLPs may be used in other example embodiments.

The generator 202 generates computer-generated responses in the form of generated neural network architectures 207 adapted to perform a task such as object detection, image classification, image segmentation or speech recognition. The generated neural network architectures 207 are provided to the discriminator 204 which evaluates the generated neural network architectures 207 and determines the top generated neural network architectures 207.

During the training stage, the generator 202 and discriminator 204 are collectively trained over iterations to provide better computer-generated responses. The generator 202 is provided with training data 201 in the form of neural network architectures and optionally noise 203. The training data 201 is retrieved from a training database 206. The generator 202 may optionally be provided with noise 203 to produce a more diverse range of computer-generated responses 205 to the task.

During the training stage, the discriminator 204 receives training data 205 in the form of example neural network architectures retrieved from the training database 206—this represents truth data and fake data, in the form of the generated neural network architectures 205 output by the generator 202. The discriminator 204 generates a ranking (or score) of the top generated neural network architectures 207 based on the ranking of the generated neural network architectures 205. The ranking of the top generated neural network architectures 207 is provided back to the generator 202 so that the generator 202 may improve the quality of the generated neural network architectures 205. At the same time, the discriminator 204 may improve its ability to distinguish the top generated neural network architectures 207 from the plurality of generated neural network architectures 205 as the generated neural network architectures 205 improve in quality.

The GA-NAS performed by the GAN 200 is an end-to-end semi-supervised framework for conducting neural architecture search that, in at least some embodiments, uses importance sampling ideas and cross-entropy method for rare event simulation. The inputs to the GAN 200 include a search space definition (available operator types, graph topologies, constraints, etc.), a starting state for the generator 202, and a set of random architectures to be used as the initial truth data/set (e.g., set of neural network architectures) for training the discriminator 205. The output of the GAN 200 is a set of neural network architectures which are all superior to the initial neural network in the truth data in terms of one or more pre-defined performance metrics such as accuracy, model size, and latency.

The GA-NAS provides a search algorithm which can be used to discover top architectures in an extremely large search space. GA-NAS is theoretically inspired by the importance sampling approach and implemented by a generative adversarial learning framework to promote efficiency. The NAS problem can be viewed as a combinatorial optimization problem. For example, suppose that x is a Directed Acyclic Graph (DAG) connecting a certain number of operations, each chosen from a predefined operation set, and let S(x) be a real-valued function representing the performance, e.g., accuracy, of x. In NAS, the real-valued function S(x) is optimized subject to $x \in X$, where X denotes the underlying search space of neural architectures.

One approach to solving a combinatorial optimization problem, especially the NP-hard ones, is to view the problem in the framework of importance sampling and rare event simulation. In this approach, GA-NAS considers a family of probability densities $\{p(.;\theta)\}_{\theta \in \Theta}$ on the set X with the goal of finding a density $p(.;\theta^*)$ that assigns higher probabilities to optimal solutions to the problem. Then, with high probability, the sampled solution from the density $p(.;\theta^*)$ will be an optimal solution. This approach for importance sampling is called the cross-entropy method.

FIG. 6 illustrates an example pseudo-code representation of an algorithm for training the GAN 200 to perform the GA-NAS in accordance with an example embodiment of the present disclosure in which the generator 202 and discriminator 204 are trained over iterations. In each iteration of GA-NAS, the generator 202 generates a new set of architectures, denoted $X_t$, which are selectively combined with previously generated architectures to generate a set of top k performing architectures, denoted $\mathcal{T}$, also known as the true set of architectures, where is k is the number of top performance architectures to be maintained. The set of top k performing architectures is updated by selecting the top k previously generated architectures, which improve over time.

The generator 202 and discriminator 204 are trained by playing a two-player minimax game whose corresponding parameters, $\phi_t$ and $\theta_t$ respectively, are optimized using the following equation (1):

$$(\theta_t, \phi_t) \leftarrow \underset{\theta_t}{\arg\min}\underset{\phi_t}{\max} V(G_{\theta_t}, D_{\phi_t}) =$$

$$\mathbb{E}_{x \sim p_{\mathcal{T}}}\big[\log D_{\phi_t}(x)\big] + \mathbb{E}_{x \sim p_{\mathcal{T}}(x;\phi_t)}\big[\log\big(1 - D_{\phi_t}(x)\big)\big] \quad (1)$$

where G denotes the generator 202 and D denotes the discriminator 204.

After the parameters $\phi_t$ and $\theta_t$ are optimized using equation (1), the generator 202 has learned to generate architectures to fit to the distribution of $\mathcal{T}$, the true set of architectures. Specifically, after optimizing in the parameters $\phi_t$ and $\theta_t$ in the t-th iteration, the generator $G(.;\theta_t)$ parameterized by $\theta_t$ learns to generate architectures from a family of probability densities $\{p(.;\theta)\}_{\theta \in \Theta}$ such that $p(.;\theta_t)$ will approximate $p_{\mathcal{T}}$, the architecture distribution in true set $\mathcal{T}$, while $\mathcal{T}$ also gets improved for the next iteration by reselecting the top k generated architectures.

It is believed that the GA-NAS under mild conditions provides a theoretical convergence guarantee based on the following theorem. If $\alpha > 0$ is any real number that indicates the performance target, such that $\max_{x \in X} S(x) \geq \alpha$, and $\gamma_t$ is defined as a level parameter in iteration t (t=0, ..., T), such that the following holds for all the architectures $x_t \in X_t$ generated by the generator $G(.;\theta_t)$ in the t-th iteration:

$$S(x_t) \geq \gamma_t, \forall x_t \in X_t. \quad (2)$$

Choose k, $|X_t|$, and the $\gamma_t$ defined above such that $\gamma_0 < \alpha$, and $\gamma_t \geq \min(\alpha, \gamma_{t-1} + \delta)$, for some $\delta > 0$, $\forall t \in \{1, \ldots, T\}$. Then, the GA-NAS algorithm can find an architecture x with $S(x) \geq \alpha$ in a finite number of iterations T.

The above theorem indicates that as long as there exists an architecture in X with performance above $\alpha$, GA-NAS is guaranteed to find an architecture with $S(x) \geq \alpha$ in a finite number of iterations. The minimax game of step 4 of the training algorithm in FIG. 6 is equivalent to minimizing the Jensen-Shannon (JS)-divergence between the distribution $p_{\mathcal{T}}$ of the currently top performing architectures $\mathcal{T}$ and the distribution $p(x;\theta_t)$ of the newly generated architectures.

The different components of the GAN 200 configured for GA-NAS followed by the respective training procedures will now be described. Although GA-NAS can operate on any search space, the described embodiment of the generator 202 and discriminator 204 is in the context of cell search. GA-NAS is evaluated for both cell search and macro search in experiments. A cell architecture $\mathcal{C}$ is a Directed Acyclic Graph (DAG) comprising multiple nodes and directed edges. Each intermediate node represents an operator, such as convolution or pooling, from a predefined set of operators. Each directed edge represents the information flow between nodes. It is assumed that a cell has at least one input node and only one output node.

The generator 202 generates architectures which, in at least some embodiments, are represented by DAGs. The generator 202, in at least some embodiments, generate architectures in an autoregressive fashion—a frequent technique in neural architecture generation such as in ENAS—via an actor model that follows an encoder-decoder framework. The encoder is a multi-layer k-GNN in at least some embodiments. The decoder, in at least some embodiments, comprises an MLP that outputs the operator probability distribution and a Gated Recurrent Unit (GRU) that recursively determines the edge connections to previous nodes. At each time step t, given a partial cell architecture $\mathcal{C}_t$ generated by the previous time steps, GA-NAS uses an encoder-decoder architecture to decide a node to insert and which previous nodes it should be connected to. The state of the architecture at the t-th time step is a partially constructed DAG. Given the state $\mathcal{C}_{t-1}$, the new node is inserted via action $a_t$. The action $a_t$ is composed of an operator type for the new node selected from a predefined operation space and its connections to previous nodes. An episode of a trajectory $\tau$ of length N is defined as the state transitions from $\mathcal{C}_0$ to $\mathcal{C}_{N-1}$, i.e., $\tau = \{\mathcal{C}_0, \mathcal{C}_1, \ldots, \mathcal{C}_{N-1}\}$, where N is an upper bound that limits the number of steps allowed in graph construction. The architecture construction terminates when the actor generates a terminal output node or the final state $\mathcal{C}_{N-1}$ is reached.

Figure 5:
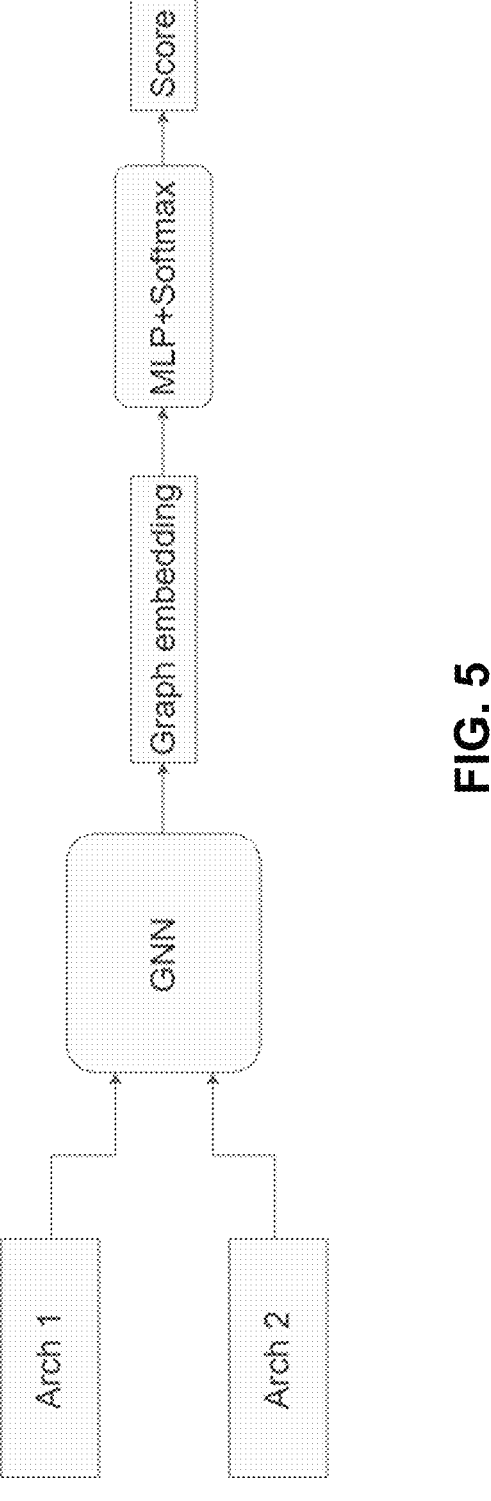
FIG. 5 illustrates a simplified block diagram of an architecture of a discriminator in accordance with an example embodiment of the present disclosure.

Referring to FIG. 5, the discriminator 204 comprises a pairwise architecture discriminator. In the training algorithm of FIG. 6 described above, the set of true architectures $\mathcal{T}$ contains a limited number of architectures. To facilitate a more efficient use of $\mathcal{T}$, a relativistic discriminator is adopted that follows a Siamese scheme. The discriminator 204 takes in a pair of architectures in which one architecture is from the set of true architectures $\mathcal{T}$ and determines whether the other architecture is from the set of true architectures $\mathcal{T}$ or the set of fake architectures $\mathcal{F}$. The discriminator 204 is implemented by encoding both cells in the pair with a shared k-GNN followed by an MLP classifier.

Generally speaking, to solve the minimax problem in step 4 of the training algorithm of FIG. 6 described above, a minibatch stochastic gradient descent (SGD) training procedure for training GANs may be followed as originally proposed in Generative adversarial nets. However, this SGD approach is not applicable to described embodiment of GA-NAS because the architectures (DAGs) generated by the generator 202 are discrete samples and their performance signals cannot be directly back-propagated to update $\theta_t$, the parameters of the generator 202 (G). Therefore, to approximate the JS-divergence minimization between the distribution of top k architectures $\mathcal{T}$, i.e., $p_\mathcal{T}$, and the generator distribution $p(x; \theta_t)$ in iteration t, step 4 of the training algorithm of FIG. 6 are replaced alternately training the generator 202 and the discriminator 204 using a procedure outlined in the algorithm of FIG. 7.

The GNN-based discriminator 204 is first using pairs of architectures sampled from $\mathcal{T}$ and $\mathcal{F}$ based on supervised learning. Then, reinforcement learning (RL) is used to train the generator 202 with a reward defined in a similar way as in Jiaxuan You, Bowen Liu, Zhitao Ying, Vijay Pande, and Jure Leskovec, *Graph convolutional policy network for goal-directed molecular graph generation*, In Advances in neural information processing systems, pages 6410-6421, 2018, (hereinafter "*Graph convolutional policy network for goal-directed molecular graph generation*") the content of which is incorporated herein by reference. The reinforcement learning includes a step reward that reflects the validity of an architecture during each step of generation and a final reward that mainly comes from the discriminator prediction D(x). When the architecture generation terminates, a final reward $R_{final}$ penalizes the generated architecture x according to the total number of violations of validity or rewards it with a score from the discriminator prediction D(x) that indicates how similar it is to the current true set $\mathcal{T}$. Both rewards together ensure that the generator 202 generates valid cells that are structurally similar to top cells from the previous time step. A Proximal Policy Optimization (PPO), a policy gradient algorithm with generalized advantage estimation to train the policy, is adopted as described in John Schulman, Filip Wolski, Prafulla Dhariwal, Alec Radford, and Oleg Klimov, *Proximal policy optimization algorithms*, arXiv preprint arXiv:1707.06347, 2017, the content of which is incorporated herein by reference.

The described learning procedure has several benefits. First, since the generator 202 samples a discrete architecture x to obtain the discriminator prediction D(x), the entire generator-discriminator pipeline is not end-to-end differentiable and cannot be trained by SGD as in a conventional GAN. Training the generator 202 with PPO solves this differentiability issue. Second, in PPO there is an entropy loss term that encourages variations in the generated actions. By tuning the multiplier for the entropy loss, the extent to which a large search space of architectures can be controlled. Third, using the discriminator outputs as the reward can significantly reduce the number of architecture evaluations compared to a conventional scheme where the fully evaluated network accuracy is used as the reward as supported by the ablation studies described below.

Figure 8:
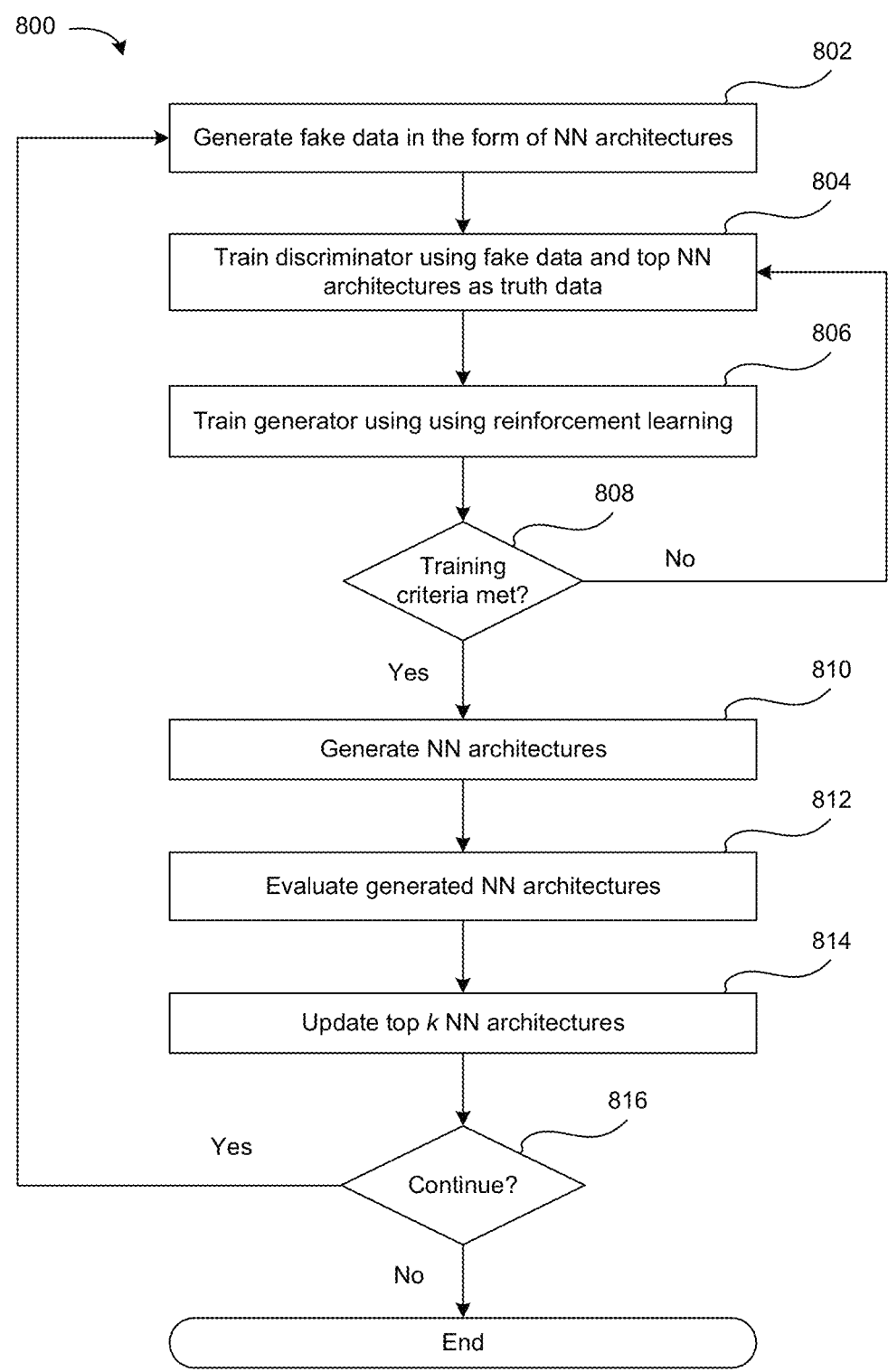
FIG. 8 illustrates a flowchart of a method for determining neural network architectures for performing a task in accordance with an example embodiment of the present disclosure.

Referring now to FIG. 8, a flowchart of a method 800 for determining neural network architectures for performing in accordance with one embodiment of the present disclosure will be described. The method 800 may be performed by one or more processors 102 of the computing system 100 which have been configured to provide the GAN 200. The method 800 performs GA-NAS by iteratively executing the steps of the method 800 of FIG. 8, described more fully below.

At step 802, the generator 202 generates fake data in the form of a plurality of neural network (NN) architectures as part of the training data 205 for training the discriminator 204. As noted above, the generator 202 is a GNN-based, auto-regressive architecture generator.

The generator 202 is operated to generate multiple architectures in an auto-regressive fashion. Because the generator 202 is trained in each iteration, the generator 202 represents a learned policy for sampling optimal architectures, which is trained in previously completed iterations. For the first interaction, the generator (policy) is randomly initialized. The input to the generator 202 is a partially completed architecture in which a number of components are missing and need to be added. The output of the generator 202 is a new architecture that has one more component added compared to the input and may be complete or still partially complete.

Figure 4:
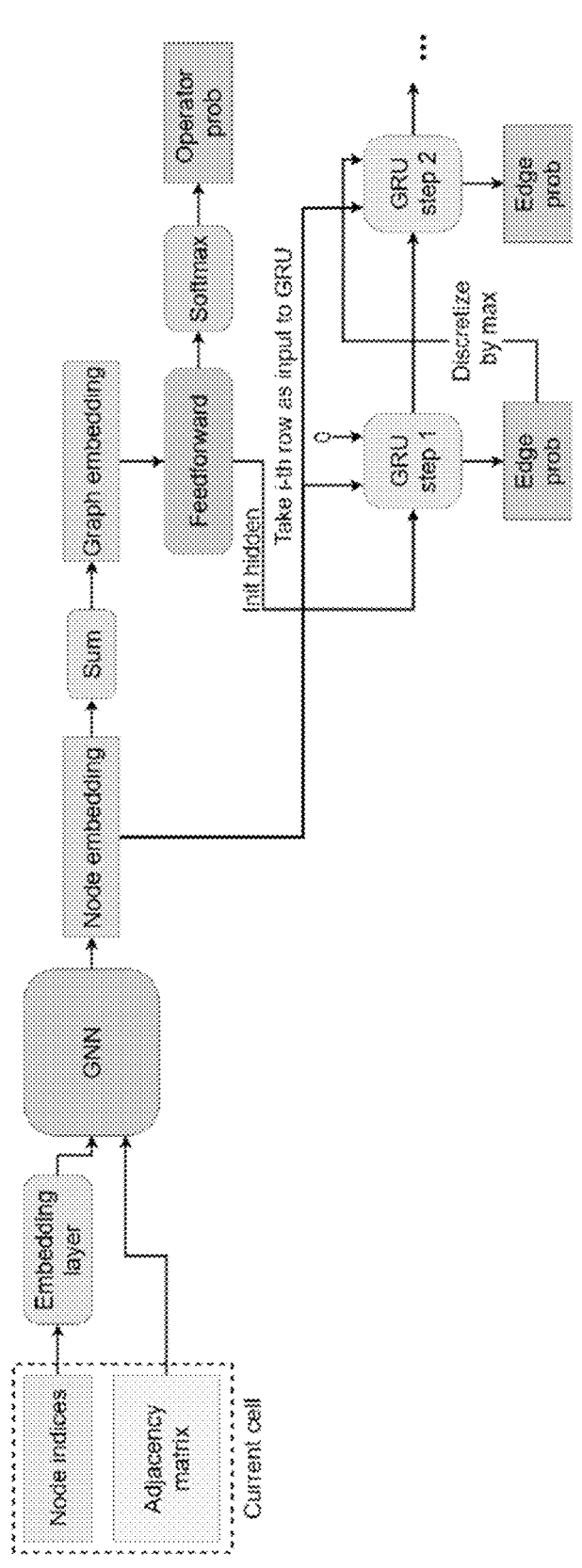
FIG. 4 illustrates a simplified block diagram of an architecture of a generator in accordance with an example embodiment of the present disclosure.

FIG. 4 illustrates a simplified block diagram of an architecture of the generator 202 in accordance with an example embodiment of the present disclosure. The generator 202 is constructed in an encoder-decoder setup in which the encoder part includes an embedding layer 402 for representing the input architecture and a multi-layer GNN for extracting useful features. The decoder is an action predictor that decides on a new component to add to the input architecture. Depending on the search space, the action predictor may have different structures. For example, in a search space in which the nodes of a architecture represent convolution operations and the edges between nodes direct the flow of information, the action predictor needs to decide on which type of operation to add to the architecture and how this new operation connects to existing nodes. The output architecture from the decoder of the generator 202 automatically becomes the input architecture for the encoder of the generator 202 in a subsequent interaction. Therefore, a complete architecture is constructed in a step-by-step (auto-regressive) fashion. The output format of the decoder is a probability distribution over the candidate action types which is sampled to generate a discrete action type. Therefore, if the sample generator 202 is operated several times, different discrete architectures will be generated for each iteration.

At step 804, the discriminator 204 is trained to distinguish between true and fake neural network architectures using the top k architectures as the truth data and the generated fake data. The discriminator 204 follows a pairwise, Siamese setup, in which the input is a pair of architectures, one architecture from the truth dataset (i.e., set of true architectures $\mathcal{T}$) from the top k architectures and a candidate architecture from either the set of true architectures $\mathcal{T}$ or the fake dataset (i.e., set of fake architectures $\mathcal{F}$). The fake dataset contains architectures generated by the current generator 202 and the truth dataset contains the current top k architectures. The generator 202 can be used to generate many input pairs by matching every architecture in the truth dataset and fake dataset to every architecture in the truth dataset. The output of the discriminator 204 is a score between 0 and 1 indicating the degree of structural similarity between the two input architectures, with 1 being the highest degree of similarity and being the lowest degree of similarity. Because it is known that one architecture is from the set of true architectures $\mathcal{T}$, this score also indicates a likelihood that the candidate architecture is from the set of true architectures $\mathcal{T}$.

FIG. 5 illustrates a simplified block diagram of the architecture of the discriminator 204 in accordance with an example embodiment of the present disclosure. The discriminator 204 contains an embedding layer for representation and a multi-layer k-GNN model for feature extraction. The discriminator 204 transforms each input architecture into a graph embedding vector. The vectors for the input architecture pairs are then concatenated together and passed to a MLP and Softmax activation setup to produce the final score. The discriminator 204 is trained by minimizing the cross-entropy loss $$\left( \text{Loss}_{CE} = -\sum_{i=1}^{n} t_i \log(p_i) \right)$$

between the truth class $t_i$ and predicted probabilities $p_i$ generated from candidate architectures from the set of true architectures $\mathcal{T}$ and set of fake architectures $\mathcal{F}$, respectively, wherein $t_i$ is a binary indicator (0 or 1) of class label (fake or real) for observation i (i.e., 0 if architecture i is actually from $\mathcal{F}$, or 1 if architecture i is actually from $\mathcal{T}$), $p_i$ is a probability value between 0 and 1. The goal is to train the generator 202 and discriminator 204 simultaneously such that the generator 202 of the GAN 200 can generate architectures that are similar to the architectures from the set of true architectures $\mathcal{T}$. In other words, the goal is to train the generator 202 of the GAN 200 so that it can trick the discriminator 204 such that it would assign a probability value close to 1 for architectures generated by the generator 202 which are, in fact, considered to be fake architectures.

At step 806, the generator 202 undergoes reinforcement learning training using the trained discriminator 204. In at least some embodiments, the Proximal Policy Optimization (PPO) algorithm. The trained discriminator 204 outputs a discriminator score which is used as a reward that the generator 202 learns to maximize.

The reinforcement learning training for the generator 202 comprises two phases. The first phase of reinforcement learning training for the generator 202 is trajectory collection. The purpose of trajectory collection is to run the generator 202 and record many architecture generation trajectories. Each trajectory contains tuples of input state, action and reward values $(s_t, a_t, r_t)$. The state in GA-NAS is defined as a partially or fully complete architecture in which a partially complete architecture has one or more missing components to be determined. In at least some embodiments, the architecture is represented as a Directed Acyclic Graph (DAG) of operators (nodes) and connections therebetween. The action is the output of the decoder, i.e., the action predictor module in the generator 202. As mentioned above, the detailed action types are dependent on the input search space. In general, the action specifies the new component to be added to the input architecture. There are two types of reward in GA-NAS. The first type of award is the step reward, which is assigned for every input state/action pair. The second type of award is the final reward, which is assigned only after an architecture is deemed to be complete. For every input state/action pair, the step reward is 0 if the action is valid, i.e., it leads to a valid new state. The validity of states will also be highly dependent on the search space.

For a complete architecture a, if it is considered invalid in the current search space, then the final reward would be $-0.1 \times$ the number of violations. If it is valid, then the final reward would be the maximum discriminator score on architecture a, which is acquired by comparing architecture a to every architecture in the truth dataset and taking the maximum value. To collect different trajectories, the generator 202 is run the same way as during fake data generation section except that the input states, actions and rewards are record. After many trajectories are collected, a Generalized Advantage Estimation (GAE) method may be performed on the trajectories to transform the trajectories into a set of (input state, action, GAE reward) tuples for training the generator 202.

The second phase of reinforcement learning training for the generator 202 is PPO training. The generator 220 is trained to minimize the PPO objective, which encourages the generated architectures to be structurally similar to the truth architectures. On the set of collected data tuples, the generator 202 is trained for multiple epochs, where in one epoch each data tuple is visited once and trained on.

The state transition is captured by a policy $\pi_\theta(a_t|\mathcal{C}_t)$, where the action $a_t$ includes predictions on a new node type and its connections to previous nodes. To learn $\pi_\theta(a_t|\mathcal{C}_t)$ in this discrete action space, the PPO algorithm with GAE is applied. The actor is trained by maximizing the cumulative expected reward of the trajectory. For a trajectory $\tau$ with a maximum allowed length of N, this objective translates to $$\max E[R(\tau)] = \max E[R_{step}(\tau)] + E[R_{final}(\tau)] \text{ s.t. } |\tau| \le N,$$

where $R_{step}$ and $R_{final}$ correspond the per-step reward and the final reward, respectively.

In the context of cell-based micro search, there is a step reward $R_{step}$, which is given to the actor after each action, and a final reward $R_{final}$, which is only assigned at the end of a multi-step generation episode. For $R_{step}$, the generator 202 is assigned a step reward of 0 if $a_t$ is valid. Otherwise, the generator 202 is assigned $-0.1$ and the episode is immediately terminated.

$R_{final}$ has two parts. The first part is a validity score $R_v$. For a completed cell $\mathcal{C}_{gen}$, if it is a valid DAG and contains exactly one output node, and there is at least one path from every other node to the output, then the actor receives a validity score of $R_v(\mathcal{C}_{gen})=0$. Otherwise, the validity score will be $-0.1$ multiplied by the number of validity violations. In our search space, four possible violations are defined: (1) there is no output node; (2) there is a node with no incoming edges; (3) there is a node with no outgoing edges; (4) there is a node with no incoming or outgoing edges. The second part of $R_{final}$ is $R_D(\mathcal{C}_{gen})$, which represents the probability that the discriminator classifies $\mathcal{C}_{gen}$ as a cell from the truth data distribution $p_{data}(x)$. In order to receive $R_D(\mathcal{C}_{gen})$ from the discriminator, $\mathcal{C}_{gen}$ must have a validity score of 0 and $\mathcal{C}_{gen}$ cannot be one of the current truth cells $\{\mathcal{C}_{true}^{j}|j=1, 2, \ldots K\}$.

The final reward $R_{final}$ for a generated architecture $\mathcal{C}_{gen}$ can be expressed in accordance with the following equation:

$$R_{final} = \begin{cases} R_v(C_{gen}) & \text{if } I(C_{gen}), \\ R_v(C_{gen}) + R_D(C_{gen}) & \text{otherwise} \end{cases}.$$

where $I(\mathcal{C}_{gen})=R_v(\mathcal{C}_{gen})<0$ or $\mathcal{C}_{gen}\in\{\mathcal{C}_{true}^{j}|j=1, 2, \ldots K\}$. The value of $R_D(\mathcal{C}_{gen})$ can be computed by conducting pairwise comparisons against the current truth cells and taking the maximum probability that the discriminator 204 will predict a 1, i.e., $R_D=\max_j P(\mathcal{C}_{gen}\in p_{data}(x)|\mathcal{C}_{gen}, \mathcal{C}_{true}^{j}; D)$, for $j=1, 2, \ldots K$, as the discriminator reward.

Maintaining a proper balance of exploration/exploitation is important for a NAS algorithm. In GA-NAS, the architecture generator 202 and discriminator 204 provide an efficient way to utilize learned knowledge, i.e., exploitation. For exploration, it is important to ensure that the generator always have some uncertainties in its actions by tuning the multiplier for the entropy loss in the PPO learning objective. The entropy loss determines the amount of randomness, hence, variations in the generated actions. Increasing its multiplier would increase the impact of the entropy loss term, which results in more exploration. In experiments, the multiplier was tuned extensively and it was found that a value of 0.1 works well for the tested search spaces.

It is noted that above formulation of the reward function also works for the single-path macro search scenario, such as EfficientNet and ProxylessNAS search spaces, in which $R_{step}$ and $R_D(\mathcal{C}_{gen})$ are modified according to the definitions of the new search space.

At step 808, it is determined whether the generator 202 and discriminator 204 are optimally trained by determined whether training criteria have been met. The training criteria may comprise, for example, one or more of a cross-entropy loss of the discriminator 204 being below a threshold, an accuracy value (Acc) of the generator 202 exceeds a threshold, and a threshold number of interactions being performed. If the training criteria have not been met, steps 804 and 806 are repeated for one or more additional iterations until the training criteria have been met. If the training criteria have been met, the method 800 moves to policy evaluation at which the generator policy is evaluated.

At step 810, after the generator 202 is trained, the generator 202 is operated to generate new architectures in the same way is operated to generate fake data as described above.

At step 812, the performance of the generated architectures output at step 810 is evaluated by determining an accuracy value (Acc). Any type of performance evaluation method may be used such as, for example, weight-sharing supernets, fully training an architecture from scratch, or performance predictors.

Figure 9:
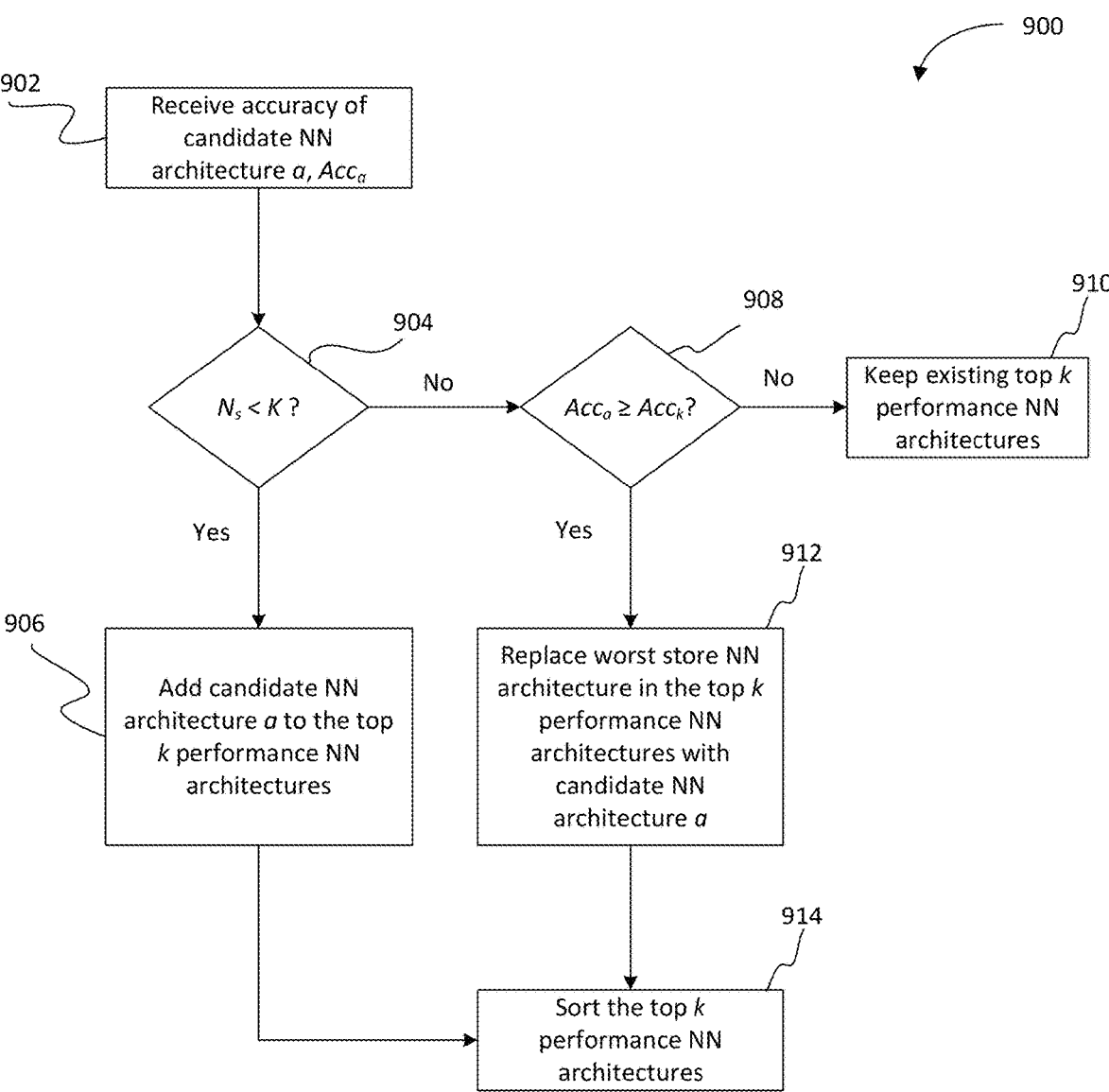
FIG. 9 illustrates a flowchart of a method for maintain a list of top performing neural network architectures in accordance with an example embodiment of the present disclosure.

At step 814, the current top-k architectures are updated based on the estimated performance of the generated architectures merging the new architectures with the existing architectures to compute a new top-k architecture set. FIG. 9 illustrates a flowchart of a method for maintain a list of top performing architectures in accordance with an example embodiment of the present disclosure.

At step 902, a new candidate architecture a and its accuracy value $Acc_a$ are received. The top performance architectures may be stored in a history tensor have a size k, the number of top performance architectures to be maintained. The value of k may be set depending on the nature of the search space. For example, k may be 64 for the NAS-Bench-201 oracle performance benchmark set with approximately 15,000 architectures the performance metrics of which are known or 500 for DARTS/PC-DARTS supernet search space with approximately $10^{18}$ architectures.

At step 904, it is determined whether the number of stored architecture $N_s$ in the history tensor $h_t$ is less than k, the number of top performance architectures to be maintained.

If the history tensor $h_t$ is not yet full, i.e. the number of stored architecture $N_s$ in the history tensor $h_t$ is less than k, the method proceeds to step 906 at which the new candidate architecture a and its corresponding performance, $Acc_a$, are added to the history tensor $h_t$.

Alternatively, if the history tensor $h_t$ contains k stored architectures, the method proceeds to step 908 at which the performance of the candidate architecture a, such as the accuracy value $Acc_a$, to the performance $Acc_k$ of the worst of the k stored architectures, such as the accuracy value $Acc_k$.

At step 910, if the performance of the new candidate architecture a, $Acc_a$, is greater than or equal to the performance of the worst stored architecture, $Acc_k$, (i.e. $Acc_a \geq Acc_k$) then the method proceeds to step 912 at which the worst stored architecture is replaced by the new candidate architecture a. Alternatively, if the performance of the new candidate architecture a, $Acc_a$, is less than the performance of the worst stored architecture, $Acc_k$, (i.e. $Acc_a < Acc_k$), then candidate architecture a is ignored, the top-k stored architectures remain unchanged, and the method 900 terminates.

Upon completion of step 906 or 912, the method proceeds to step 914 at which the stored architectures are optionally sorted in order of performance, such as accuracy value Acc. An ordered list of stored architectures may ensure that the worst stored architecture k is properly maintained and readily accessible for the next iteration if needed. The sorting of step 914 may be omitted if the architectures are stored in the order of performance.

At step 816, it is determined whether to continue the method based on termination criteria. The termination criteria may be a threshold number of iterations. If the threshold number of iterations has not been completed, the operations return to step 802. For example, the steps 802 to 814 may be repeated until the threshold number of iterations are completed. If the threshold number of iterations has been completed, the final top-k architectures are output by the GAN 200.

Figure 3:
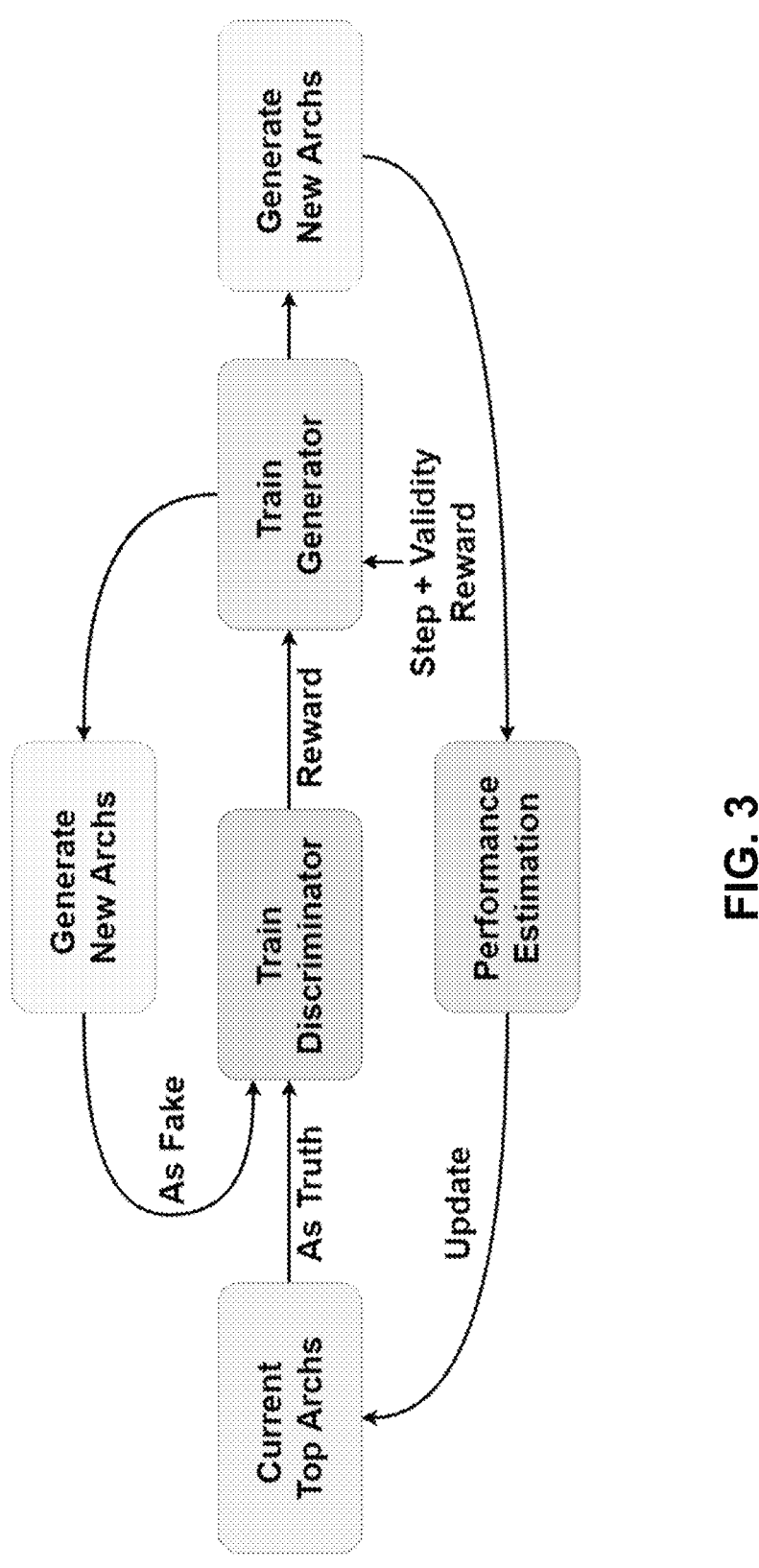
FIG. 3 illustrates a state transition diagram for the GAN of FIG. 2 in accordance with an example embodiment of the present disclosure.

FIG. 3 illustrates the method 800 in a state transition diagram. In the state transition diagram of FIG. 3, the block "Generate New Archs" state corresponds to steps 802 and 814 of the method 800 of FIG. 2.

Experimental Results

The performance of the GA-NAS of the present disclosure as a search algorithm has been evaluated by comparing it with a wide range of existing NAS algorithms in terms of convergence speed and stability on NAS benchmarks. The results show the capability of the GA-NAS of the present disclosure to improve a given network, including already optimized strong baselines such as EfficientNet and ProxylessNAS.

Results on NAS Benchmarks with or without Weight Sharing

To evaluate the GA-NAS of the present disclosure as a search algorithm and decouple it from the impact of search spaces, three NAS benchmarks were queried: NAS-Bench-101, NAS-Bench-201, and NAS-Bench-301. The goal of the evaluation was to determine the highest ranked cell with as few queries as possible. The number of queries to the NAS benchmark was used as a reliable measure for search cost in recent NAS literature because each query to the NAS benchmark corresponds to training and evaluating a candidate architecture from scratch, which constitutes the major bottleneck in the overall cost of NAS. By checking the rank an algorithm can reach in a given number of queries, the convergence speed of a search algorithm can be evaluated with more queries made to the benchmark indicating a longer evaluation time or higher search cost in a real-world problem.

To further evaluate the GA-NAS of the present disclosure when the true architecture accuracies are unknown, a weight-sharing supernet was trained on NAS-Bench-101 and compared the GA-NAS with a range of NAS schemes based on weight sharing. NAS-Bench-101 is the first publicly available benchmark for evaluating NAS algorithms. NAS-Bench-101 has 423,624 DAG-style cell-based architectures, each trained and evaluated for 3 times. Metrics for each run include training time and accuracy. Querying NAS-Bench-101 corresponds to evaluating a cell. The results are provided with respect to two configurations. In the first configurations, the following parameters were set $|X_0|=50$, $|X_t|=+50$, $t\geq1$, and $k=25$. In the second configuration, the following parameters were set $|X_0|=100$, $|X_t|=|X_{t-1}|+100$, $t\geq1$, and $k=50$. For both configurations, the initial set $X_0$ is picked to be a random set and the number of iterations $T$ is 10. Each configuration was run with 10 random seeds and the search cost for a run was 8 GPU hours on GeForce GTX 1080 Ti.

FIG. 10 illustrates a table comparing GA-NAS to other methods for the best cell that can be found by querying NAS-Bench-101 in terms of the accuracy and the rank of this cell in NAS-Bench-101 along with the number of queries required to find that cell. FIG. 11 illustrates a table showing the average performance of GA-NAS in the same experiment over multiple random seeds. The number of queries (Q) for Random Search was set to be the same as the average number of queries incurred by GA-NAS. FIG. 10 does not list the average performance of other methods except Random Search since all the other methods only reported their single-run performance on NAS-Bench-101 in their respective experiments.

FIGS. 10 and 11 show that GA-NAS can reach a higher accuracy in fewer number of queries is better than the best published results by a significant margin. It is noted that 94.22% is the $3^{rd}$ best cell while 94.23% is the $2^{nd}$ best cell in NAS-Bench-101. From FIG. 11, it is observed that GA-NAS achieves superior stability and reproducibility: GA-NAS-setup1 consistently finds the $3^{rd}$ best in 9 runs and the $2^{nd}$ best in 1 run out of 10 runs; GA-NAS-setup2 finds the $2^{nd}$ best in 5 runs and the $3^{rd}$ best in the other 5 runs.

To evaluate GA-NAS when true accuracy is not available, a weight-sharing supernet was trained on the search space of NAS-Bench-101 to determine the true test accuracies of architectures found by GA-NAS. The supernet evaluated the accuracy of a cell on a validation set of 10 k instances of CIFAR10 with a search time including supernet training of around 2 GPU days.

FIG. 12 illustrates a table showing the results of searching on NAS-Bench-101 with weight-sharing, with the mean test accuracy of the best cells from 10 runs, and the best accuracy/rank found by a single run in comparison to other weight-sharing NAS schemes. It was observed that using a supernet degrades the search performance in general as compared to true evaluation because weight-sharing often cannot provide a completely reliable performance for the candidate architectures. Nevertheless, GA-NAS outperforms other approaches.

NAS-Bench-201 contains 15,625 evaluated cells. The search space has 6 searchable edges and 5 candidate operations. GA-NAS was tested on NAS-Bench-201 by conducting 20 runs for CIFAR-10, CIFAR-100, and ImageNet-16-

120 using the true test accuracy. The baselines from the original NAS-Bench-201 were used to compared against by directly querying the benchmark data. Since no information on the rank achieved and the number of queries is reported for these baselines, GA-NAS was compared to Random Search (RS-500), which evaluates 500 unique cells in each run. FIG. 13 illustrates a table presenting the results searching on NAS-Bench-201 without weight sharing with the mean accuracy and rank of the best cell found reported. #Q represents the average number of queries per run. A total of 20 runs were conducted for GA-NAS. It was observed that GA-NAS outperforms a wide range of baselines including Evolutionary Algorithm (REA), Reinforcement Learning (REINFORCE), and Bayesian Optimization (BOHB), on the task of finding the most accurate cell with much lower variance. Notably, on ImageNet-16-120, GA-NAS outperforms REA by nearly 1.3% on average.

Compared to RS-500, GA-NAS finds cells that are higher ranked while only exploring less than 3.2% of the search space in each run. In addition, in the 20 runs on all three datasets, GA-NAS found find the best cell in the entire benchmark more than once. Specifically, for CIFAR-10, GA-NAS found the best cell in 9 out of 20 runs.

NAS-Bench-301 is another recently proposed benchmark based on the same search space as DARTS. Relying on surrogate performance models, NAS-Bench-301 reports the accuracy of $10^{18}$ unique cells. Of particular interest is how the number of queries (#Q) needed to find an architecture with high accuracy scales in a large search space. GA-NAS was tested on NAS-Bench-301 v0.9. The results were compared with Random (RS) and Evolutionary (EA) search baselines. FIG. 18 illustrates a plot of the average best accuracy along with the accuracy standard deviations versus the number of queries incurred under the three methods. It is observed that GA-NAS outperforms RS at all query budgets and outperforms EA when the number of queries exceeds 3 k. The results on NAS-Bench-301 confirm that for GA-NAS, the number of queries (#Q) required to find a good performing cell scales well as the size of the search space increases. For example, on NAS-Bench-101, GA-NAS usually needs around 500 queries to find the $3^{rd}$ best cell, with an accuracy of approximately 94% among 423 k candidates, while on the huge search space of NAS-Bench-301 with up to $10^{18}$ candidates, GA-NAS only needed s around 6 k queries to find an architecture with accuracy approximately equal to 95%.

In contrast to GA-NAS, EA search is less stable and does not improve much as the number of queries increases over 3000. GA-NAS surpasses EA for #Q greater than or equal to 3000 in FIG. 17. The variance of GA-NAS is also much lower than the variance of the EA solution over all ranges of #Q. Even though for #Q less than 3000, GA-NAS and EA are close in terms of average performance, EA suffers from a huge variance.

Ablation studies were also performed to determine how much the discriminator contributes to the superior search performance. The ablation study was performed on NAS-Bench-101 by creating an RL-NAS algorithm for comparison. RL-NAS removes the discriminator in GA-NAS and directly queries the accuracy of a generated cell from NAS-Bench-101 as the reward for training. The performance of RL-NAS was tested under two setups that differ in the total number of queries made to NAS-Bench-101. FIG. 14 illustrates a table showing the results.

Compared to GA-NAS-Setup2, RL-NAS-1 makes 3 times more queries to NAS-Bench-101 yet cannot outperform either of the GA-NAS setups. If the number of queries are limited as in RL-NAS-2 then the search performance deteriorates significantly. Therefore, it can be concluded that the discriminator in GA-NAS is important for reducing the number of queries, which converts to the number of evaluations in real-world problems as well as finding architectures with better performance.

In view of the above, it will be appreciated that GA-NAS significantly reduces computational cost of search. In a traditional RL-based NAS algorithm the reward signal for training the architecture generator is usually just the estimated performance of the generated architectures. However, the computational cost required for getting the estimated performance could be expensive. For instance, fully training an architecture from scratch could take many GPU days. Therefore, a smarter search algorithm would make fewer costly evaluation but at the same time finds better performing architectures. In summary, the number of unique architectures submitted for performance estimation during search is a fair indicator of its overall computational cost. Among the existing NAS algorithms, this cost is often too high, which seriously affects their scalability to larger search spaces.

With the GAN training framework, GA-NAS significantly reduces the number of unique architectures submitted for performance estimation during search, hence lowers the overall computational cost of search. Specifically, in GA-NAS the discriminator provides the main reward signal for training the generator. As a result, there is no architecture submitted for performance estimation during generator training.

On the public NAS-Bench-101 benchmark, GA-NAS finds architectures with better accuracy at a much lower computational cost (#Q, the number of queries to the benchmark, which is also the total number of unique architectures submitted for performance estimation).

Improvement of Existing Neural Architectures

It was also demonstrated that GA-NAS can improve existing neural architectures, including ResNet and Inception cells in NAS-Bench-101, EfficientNet-B0 under hard constraints, and ProxylessNAS-GPU in unconstrained search. For ResNet and Inception cells, GA-NAS was used to find better cells from NAS-Bench-101 under a lower or equal training time and number of weights. This can be achieved by enforcing a hard constraint in choosing the truth set Tin each iteration. The results are shown in FIG. 15 which illustrates a table showing constrained search results on NAS-Bench-101 for different algorithms. As shown, GA-NAS can find cells that are superior to the ResNet and Inception cells in terms of test accuracy, training time, and the number of weights. GA-NAS can find new, dominating cells for both cells, showing that it can enforce ad-hoc constraints in search, a property not previously enforceable by regularizers. Random Search was also tested under a similar number of queries to the benchmark under the same constraints, which is unable to outperform GA-NAS.

Well-known architectures found on ImageNet i.e., EfficientNet-B0 and ProxylessNAS-GPU, which are already optimized strong baselines found by other NAS methods, were also considered. It was shown that GA-NAS can be used to improve a given architecture in practice by searching in its original search space.

Figures 16, 17:
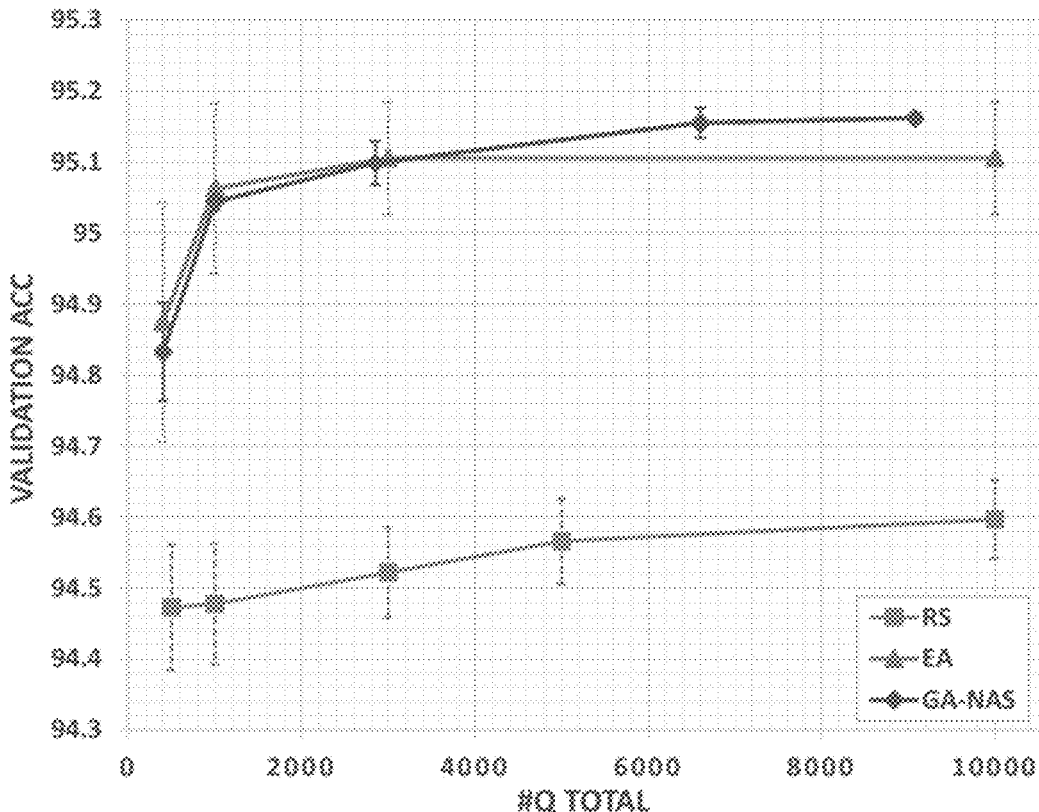
FIG. 16 illustrates a table showing the improvements made by GA-NAS over existing neural network architectures.
FIG. 17 illustrates a plot of NAS-Bench-301 results comparing the means/standard deviations of the best accuracy found at various total query limits.

For EfficientNet-B0, a constraint was set that the found networks all have an equal or lower number of parameters than EfficientNet-B0. For the ProxylessNAS-GPU model, it was put in the starting truth set and run an unconstrained search to further improve its top-1 validation accuracy. FIG. 16 illustrates a table presenting the improvements made by GA-NAS over both existing models/architectures. Compared to EfficientNet-B0, GA-NAS can find new single-path networks that achieve comparable or better top-1 accuracy on ImageNet with an equal or lower number of trainable weights. The accuracy of EfficientNet-B0 and the GA-NAS variants are reported without data augmentation. Total search time including supernet training is around 680 GPU hours on Tesla V100 GPUs. It is noted that the original EfficientNet-B0 is found using the MNasNet with a search cost over 40,000 GPU hours.

For ProxylessNAS experiments, a supernet was trained on ImageNet and an unconstrained search was conducted using GA-NAS for 38 hours on 8 Tesla V100 GPUs, a major portion of which, i.e., 29 hours is spent on querying the supernet for architecture performance. Compared to ProxylessNAS-GPU, GA-NAS can find an architecture with a comparable number of parameters and a better top-1 accuracy.

Most existing NAS algorithms only take in a search space as input—they do not consider the rich knowledge within the existing popular neural architectures, which may provide extremely useful clues to help the algorithm locate a better architecture in a shorter time. In other words, most existing NAS algorithms can only start the search from scratch. If a set of good performing architectures is already known, this may provide important information on where to search, and most existing NAS algorithms cannot take advantage of this information.

The design of GA-NAS naturally addresses this problem because a set of architectures can be provided as the initial truth data. If a set of good performing architectures is not known, randomly selected architectures can provide the initial truth data. However, if a set of good performing architectures is available, this set can be used directly as the initial truth data to take full advantage of the network design knowledge expressed by the architectures within the set. For example, we can use GA-NAS to improve the accuracy of well-known architectures found on ImageNet, i.e., EfficientNet-B0 and ProxylessNAS-GPU, which are already optimized strong baselines, as shown in FIG. 16.

On the public NAS-Bench-101 benchmark, GA-NAS is able to improve the hand-crafted ResNet and Inception architectures by finding new architectures that are better/equal in terms of accuracy, number of trainable weights, and training time, as shown in FIG. 15.

Enforcement of Hard Ad-Hoc Constraints During the Search

GA-NAS is able to easily enforce hard ad-hoc constraints during the search. A constraint is often an upper bound on some properties of the searched architectures, e.g., model size, flops, inference latency. Most existing NAS algorithms can only incorporate "soft" constraints by introducing penalizing terms in their objectives. These terms do not guarantee that the constraints are always satisfied. Moreover, since the main objective of the search is often to maximize the performance on a given task, it is difficult to tune these penalizing terms such that they do not impose a negative influence on the main objective.

The design of GA-NAS allows for the inclusion of one or more hard constraints such that no output architecture can ever violate the specified bound. To achieve this, the truth data set can be filtered every time it is updated to ensure that every truth architecture satisfies the constraints. Since the generator is trained to mimic the truth data, it can then implicitly learn to satisfy all the constraints. Additionally, because the constraints are not part of the training objectives, the actual generator and discriminator training procedures are unaffected.

The GA-NAS of the present disclosure and further experimental results therefor can be found in Seyed Saeed Changiz Rezaei, Fred X. Han, Di Niu, Mohammad Salameh, Keith Mills, Shuo Lian, Wei Lu, Shangling Jui, Generative Adversarial Neural Architecture Search, arXiv:2105.09356, Jun. 23, 2021, the content of which is incorporated herein by reference.

Although the foregoing description uses a generative adversarial network (GAN) for the GA-NAS, it will be appreciated that the teachings of the present disclosure may be applied to other generator models such as variational auto encoders (VAEs) and its variants.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for neural architectural search (NAS) for performing a task, the method comprising:

receiving, by a generative adversarial network comprising a generator and a discriminator, from a user device, a query for neural network architecture, the query including a search space, wherein the discriminator of the generative adversarial network is trained by minimizing a cross-entropy loss between a truth class and predicted probabilities generated from candidate architectures from a set of true architectures or a set of fake architectures respectively;

generating, via the generator of the generative adversarial network, a plurality of generated neural network architectures responsive to the received search space;

selecting, via the discriminator of the generative adversarial network, an optimal neural network architecture from among the plurality of generated neural network architectures; and transmitting the optimal generated neural network architecture to the user device.

2. The method of claim 1, further comprising:

training the generative adversarial network by:

generating, by the generator component of the generative adversarial network, generated neural network architectures based on training data, evaluating, by the discriminator of the generative adversarial network, the generated neural network architectures, ranking, by the discriminator, the generated neural network architectures, and adjusting one or more parameters of the generator based on the ranking of the generated neural network architectures.

3. The method of claim 2, wherein the training data comprises the set of true architectures.

4. The method of claim 2, wherein the discriminator applies a Siamese scheme in which a pair of architectures in which one architecture is from the set of true architectures and the other architecture is from either the set of true architectures or the set of fake architectures comprising of generated neural network architectures.

5. The method of claim 2, wherein the generator and the discriminator are trained by playing a two-player minimax game whose corresponding parameters, $\phi_t$ and $\theta_t$ respectively, are optimized using:

$$(\theta_t, \phi_t) \leftarrow \arg \min_{\theta_t} \max_{\phi_t} V(G_{\theta_t}, D_{\phi_t}) =$$

$$\mathbb{E}_{x \sim p_{\mathcal{J}}}[\log D_{\phi_t}(x)] + \mathbb{E}_{x \sim p_{\mathcal{J}}(x;\phi_t)}[\log(1 - D_{\phi_t}(x))]$$

where G denotes the generator and D denotes the discriminator, x is a Directed Acyclic Graph (DAG) connecting one or more operations, and $p_{\mathcal{J}}$ is a distribution of currently top performing architectures $\mathcal{J}$.

6. The method of claim 1, wherein the generator comprises an encoder and a decoder.

7. The method of claim 6, wherein the encoder is a graph neural network (GNN)-based, auto-regressive architecture encoder comprising a recurrent neural network (RNN) and GNN.

8. The method of claim 6, wherein the decoder comprises a multi-layer perceptron (MLP) that outputs an operator probability distribution and a Gated Recurrent Unit (GRU) that recursively determines edge connections to previous operators.

9. The method of claim 1, wherein the generator represents each architecture as a Directed Acyclic Graph (DAG) of operators and connections therebetween.

10. The method of claim 1, wherein the discriminator comprises a GNN followed by a MLP classifier.

11. A system for neural architectural search (NAS) using a generative adversarial network, comprising:

a processing device; and a memory coupled to the processing device, the memory storing computer-executable instructions that, in response to execution by the processing device, cause the system to:

receive, by a generator of the generative adversarial network, from a user device, a query for neural network architecture, the query including a search space; and generate, via the generator of the generative adversarial network, a plurality of generated neural network architectures responsive to the received search space; and select, via a discriminator of the generative adversarial network, an optimal neural network architecture from among the plurality of generated neural network architectures;

wherein the optimal generated neural network architecture is transmitted to the user device, and wherein the discriminator of the generative adversarial network is trained by minimizing a cross-entropy loss between a truth class and predicted probabilities generated from candidate architectures from a set of true architectures or a set of fake architectures respectively.

12. The system of claim 11, wherein the generative adversarial network is trained by:

generating, by the generator component of the generative adversarial network, generated neural network architectures based on training data, evaluating, by the discriminator of the generative adversarial network, the generated neural network architectures, ranking, by the discriminator, the generated neural network architectures, and adjusting one or more parameters of the generator based on the ranking of the generated neural network architectures.

13. The system of claim 12, wherein the discriminator applies a Siamese scheme in which a pair of architectures in which one architecture is from the set of true architectures and the other architecture is from either the set of true architectures or the set of fake architectures comprising of generated neural network architectures.

14. The system of claim 11, wherein the generator and the discriminator are trained by playing a two-player minimax game whose corresponding parameters, $\phi_t$ and $\theta_t$, respectively, are optimized using:

$$(\theta_t, \phi_t) \leftarrow \arg \min_{\theta_t} \max_{\phi_t} V(G_{\theta_t}, D_{\phi_t}) =$$

$$\mathbb{E}_{x \sim p_{\mathcal{T}}}\left[\log D_{\phi_t}(x)\right] + \mathbb{E}_{x \sim p_{\mathcal{T}}(x;\phi_t)}\left[\log\left(1 - D_{\phi_t}(x)\right)\right]$$

where G denotes the generator and D denotes the discriminator, x is a Directed Acyclic Graph (DAG) connecting one or more operations, and $p_{\mathcal{T}}$ is a distribution of currently top performing architectures $\mathcal{T}$.

15. The system of claim 11, wherein the generator comprises an encoder and a decoder.

16. The system of claim 15, wherein the encoder is a graph neural network (GNN)-based, auto-regressive architecture encoder comprising a recurrent neural network (RNN) and GNN.

17. The system of claim 11, wherein the decoder comprises a multi-layer perceptron (MLP) that outputs an operator probability distribution and a Gated Recurrent Unit (GRU) that recursively determines edge connections to previous operators.

18. The system of claim 11, wherein the generator represents each architecture as a Directed Acyclic Graph (DAG) of operators and connections therebetween.

19. The system of claim 11, wherein the discriminator comprises a GNN followed by a MLP classifier.

20. A non-transitory machine-readable storage medium having tangibly stored thereon executable instructions for execution by one or more processors that, in response to execution by the one or more processors, cause the one or more processors to:

receive, by a generative adversarial network comprising a generator and a discriminator, from a user device, a query for neural network architecture, the query including a search space, wherein the discriminator of the generative adversarial network is trained by minimizing a cross-entropy loss between a truth class and predicted probabilities generated from candidate architectures from a set of true architectures or a set of fake architectures respectively;

generate, via the generator of the generative adversarial network, a plurality of generated neural network architectures responsive to the received search space;

select, via the discriminator of the generative adversarial network, an optimal neural network architecture from among the plurality of generated neural network architectures; and transmit the optimal generated neural network architecture to the user device.

\* \* \* \* \*